(12) United States Patent
Horiuchi et al.

(10) Patent No.: US 6,515,774 B2
(45) Date of Patent: Feb. 4, 2003

(54) DOCUMENT IMAGE READING DEVICE

(75) Inventors: Takao Horiuchi, Nara (JP); Shigeru Watase, Gojo (JP); Jun Morimoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/150,350

(22) Filed: May 16, 2002

(65) Prior Publication Data

US 2002/0131093 A1 Sep. 19, 2002

Related U.S. Application Data

(63) Continuation of application No. 09/187,352, filed on Nov. 6, 1998, now Pat. No. 6,445,469.

(30) Foreign Application Priority Data

Dec. 3, 1997 (JP) ............................................. 9-332661

(51) Int. Cl.⁷ ............................ H04N 1/04; H04N 1/00
(52) U.S. Cl. ...................... 358/474; 358/406; 358/443; 358/445
(58) Field of Search .................................. 358/406, 428, 358/429, 443, 445, 447, 448, 463, 474, 486, 512, 523, 409, 412, 418, 482; 382/299, 300

(56) References Cited

U.S. PATENT DOCUMENTS

| | | | | |
|---|---|---|---|---|
| 5,483,359 A | * | 1/1996 | Yumiba et al. | 358/513 |
| 5,596,609 A | * | 1/1997 | Genrich et al. | 375/350 |
| 5,731,769 A | * | 3/1998 | Girardeau, Jr. et al. | 341/61 |
| 5,880,687 A | * | 3/1999 | May et al. | 341/61 |
| 5,986,989 A | * | 11/1999 | Takagi et al. | 369/44.34 |
| 6,000,776 A | * | 12/1999 | Suzuki et al. | 347/19 |
| 6,043,905 A | * | 3/2000 | Kato | 358/448 |
| 6,182,103 B1 | * | 1/2001 | Zierhofer | 708/319 |
| 6,268,934 B1 | * | 7/2001 | Nishioka | 358/409 |
| 6,271,940 B1 | * | 8/2001 | Deschuytere et al. | 358/504 |
| 6,445,469 B1 | * | 9/2002 | Horiuchi et al. | 358/406 |

FOREIGN PATENT DOCUMENTS

JP          04-196964          7/1992

* cited by examiner

*Primary Examiner*—Madeleine Nguyen
*Assistant Examiner*—Joseph R. Pokrzywa
(74) *Attorney, Agent, or Firm*—Dike, Bronstein, Roberts & Cushman IP Group Edwards & Angell, LLP; David G. Conlin; George W. Hartnell, III

(57) ABSTRACT

A document-image reading device that can analyze a speed fluctuation state of a scanner when scanning an image in the feed direction by separately extracting speed fluctuation components by reading a change in density of reference scale lines and, on the basis of the analysis result, prevents the occurrence of an image blur that may be resulting from unstable factors of a driving mechanism. The document-image reading device for reading a document image data at a specified time-interval given by the reference clock signal, which comprises an image sensor for reading a document image by moving the image sensor or the document in the feed direction and is featured in that the document-image reading device is further provided with a chart reader for reading a reference chart portion having alternations of a high-density division and a low-density division arranged one after another at a distance-interval equal to a least pitch readable by the document-image reading device along the feed direction and a processor for processing image data read from the reference chart portion by using a comb-type filter and by integration.

1 Claim, 28 Drawing Sheets

ONE-DOT WIDTH  ONE-DOT WIDTH

TWO-DOT WIDTH OR LARGER

ONE-DOT WIDTH

DOCUMENT IMAGE READING DEVICE

CROSS REFERENCE TO RELATED APPLICATIONS

This application is a continuation of U.S. Ser. No. 09/187,352, filed Nov. 6, 1998 now U.S. Pat. No. 6,445,469.

BACKGROUND OF THE INVENTION

The present invention relates to an image reading device for use in a facsimile, a copying machine and a scanner, which device can read an image data from a specified area of an original document by using an original document reading mechanism such as a line sensor for reading image data from an original image at a specified time-interval based on a reference clock and a mechanism for moving the original document or the image reading mechanism.

Conventional facsimiles and copying machines, which read an original document image by using an image reading system using a line sensor consisting of linearly arranged image sensors such as CCDs, involve such a common problem that a distorted image may be produced due to fluctuation (variation) of document image scanning speed since the document or the reading head is mechanically moved in the feed (vertical scanning) direction.

Japanese Laid-Open Patent Publication No. 4-196964 discloses an image reading device that can detect a change in the scanning speed (fluctuation) by using a flowchart as shown in FIG. 1.

The image reading device reads a document image together with an equal-pitch scale (reference scale) consisting of high-density and low-density lines of the same width, which lines are arranged alternatively at the same distance in the feed direction. Namely, its image-reading means such as a line sensor read the document image and the equal-pitch scale at the same time, detects read-time intervals of respective line-to-line distances of the scale (i.e., each distance from a high-density line to subsequent low-density line) and compares the detected time-intervals with the known reference value to determine the scanning speed fluctuation.

The essence of the art described in Japanese Laid-Open Patent Publication No. 4-196964 consists in that the fluctuation of the scanning speed is determined by reading the image together with an equal-pitch scale disposed in the feed direction and comparing read-time intervals of the scale lines with the known reference value. This method can improve the accuracy of image scanning to compensate the possible distortion of a reproduced image due to fluctuation of the scanning speed without a considerable increase of the manufacturing cost of the image reading device.

However, the line sensor used in the above-described device is driven by clock signals and reads a document image at a specified time-interval in synchronism with the clock signals.

Consequently, a change in the scanning speed may not be detected if the displacement due to the scanning speed change of the scanner is smaller than one pixel in the feed direction. To increase the resolving power of the line sensor for detecting the scanning speed fluctuation, it is necessary to considerably increase the clock frequency. This solution, therefore, is impractical in view of increasing high-frequency noise and additional cost.

In case of reading the reference line scale by using analog elements (photo diodes or photo transistors) in combination with a specialized A/D converter, time must be measured by using a high-speed A/D converter, a high-speed timer and a high-response optical device. This may also arise the problems of increasing high-frequency noise and increasing the cost.

Furthermore, the use of a higher frequency clock cannot always enable the line sensor to finely read the equal-pitch line scale for analysis of the speed fluctuation because the size of an image read by one pixel of the line sensor is determined by an optical lens system interposed between a document and the line sensor. Namely, the line sensor may not detect the scanning speed fluctuation if the displacement due to the fluctuation is smaller than one pixel in the feed direction.

The reference line scale used in the conventional image reading systems is an arrangement of lines alternating black (high-density part) and white (low-density part) with the same width. There may arise a problem that a half-pitch shift of the reading pitch frequency of a scanner in the feed direction from the frequency of the equal-pitch lines of the reference scale may result in outputting a halftone image which cannot be analyzed.

The use of an equal-pitch scale having lines with width not less than two pixels of the line sensor for solving the above problem may make the system unable to detect scanning speed fluctuation.

Analysis of the scanning speed fluctuation by integration of results of obtained by processing an image from its top with a comb filter may have an incorrect result if read image data contains erroneous data due to a small change in the density of the equal-pitch scale image and the presence of dust and noise when reading the image.

In addition, the above calculation premises that the same outputs appear continuously to represent black or white lines of the reference scale image. However, the black and white lines of the scale may have small fluctuation of output values in may case by the effect of adjustments of the line sensor and the A/D converter and the above-mentioned errors.

Therefore, the white line has width equal to two pixels can not always have the same values by two successive pixels at the output of the A/D converter. Speed fluctuation component cannot be separated and extracted if the two white lines of the reference scale have different output values.

The above problem may be avoided by applying a single correction factor to all image data so that all white parts and all black parts may have respective fixed values. However, this solution may cause partial excessive or insufficient compensation if a white shading level or a black shading level is preset to vary while the scanner scans image data in the feed direction. The accuracy of analysis may be decreased.

Furthermore, when the corrected values are not only used for separating a black line part from a white-line part but used for calculating the scanning speed fluctuation, the analysis may not attain the sufficient accuracy depending on the corrected state.

It can be also sought to observe the scanning speed fluctuation by extracting a two-dot part showing the same output values in series and determining a value of this position by extracting an integrated value of the part exiting ahead by two dots from the extracted output value. This method, however, has a final result of subtraction at a portion from a black-line to a white-line or at a portion from a while-line to a black-line. For white or black lines each having a width of two dots or more, final values are spaced with the white or black part width, zeroing data for each spacing.

Consequently, only a part of data obtained by processing outputs of the A/D converter with a comb filter is used and remaining data is discarded. No improvement is achieved even by holding a preceding value for each zero-data part.

In other words, the analysis with a chart having a widened frequency (e.g., black line of 1 dot in width and a white line widened to x dots in width) can effectively use only 2/(x+1) of measurement results.

SUMMARY OF THE INVENTION

The object of the present invention is to provide a document-image reading device that can separate and extract a speed fluctuation component by determining a gray-level change of each scale line (not reading time-interval), analyze a state of speed fluctuation of scanning in the feed direction and, based on the analysis result, eliminate the possibility of image deformation that may be caused from the unstable factors of the driving mechanism of the device.

Namely, a speed fluctuation component is separately extracted by reading a change in gray level of respective scale lines and analyzed a speed fluctuation state of a scanner scanning in the feed direction and deformation of an image can be eliminated based on the analysis result.

Another object of the present invention is to provide a document-image reading device that can separately extract speed fluctuation of its scanner when working with an equal-pitch scale representing alternations of a black line of one pixel in width and a white line of two pixels in width.

Another object of the present invention is to provide a document-image reading device that can perform high-accuracy high-resolution analysis of the scanning speed fluctuation with no affection of partial abnormal data to an entire analysis result.

Another object of the present invention is to provide a document-image reading device that can accurately analyze the speed fluctuation without decreasing the accuracy due to dispersion of reading a scale image.

Another object of the present invention is to provide a document-image reading device that can accurately analyze the speed fluctuation without decreasing the accuracy in the case when a shading level varies during scanning operation.

Another object of the present invention is to provide a document-image reading device that can always perform accurate correction of image data, eliminating the possibility of decreasing the accuracy of analysis depending the correction state.

A document-image reading device of the present invention comprises document-image reading means for reading a document image data at a specified interval given by a reference clock by moving the document-image reading means or the document in the feed direction, which means is further provided with a reference chart reading means for reading a reference chart portion representing alternations of a high-density division and a low-density division arranged in the feed direction at an interval equal to a least pitch readable by the document-image reading means and processing means for processing image data read from the reference chart by using a comb filter followed by integration.

The construction of the device can attain higher accuracy of the speed fluctuation analysis in comparison with a method for measuring time-intervals between lines of an image read from a reference chart (equal-pitch scale) portion.

A document-image reading device of the present invention comprises document-image reading means for reading a document image data at a specified interval given by a reference clock by moving the document-image reading means or the document in the feed direction and is featured in that the document-image reading means is further provided with a reference chart reading means for reading a reference chart portion representing alternations of a high-density division and low-density division, in which every high-density or low-density divisions has a width equal to a least readable pitch and every low-density division has a width equal to an integer-multiple of the least readable pitch, thus the high-density divisions and low-density divisions alternately arranged one after another at respective equal intervals in the feed direction, and processing means processing the image data read from the reference chart by using a comb filter followed by integration, extracting continuous detection of the substantially same integrated values by the integer number of times and determining an integrated value at the extracted position by reducing the extracted integrated value by an integrated value at an upstream point at a distance of the integer-multiple of the least-readable pitch along the feed direction.

This device can therefore eliminate the possibility of making the image data of the equal-pitch scale become an unanalysable 50% gray scale when the reading pitch of the CCD in the feed direction deviates from the pitch of the equal-pitch scale by a ½ dot.

Furthermore, the device can obtain higher accuracy of analysis because the analysis can be made by subtracting only peripheral portions when integrated values are the same subsequent values. Namely, the affection of an abnormal value of the partial image on a whole analysis result can be surely avoided.

A document-image reading device of the present invention comprises a document-image reading means for reading image data from a document at a specified time-interval based on a reference clock by moving said document image reading means or the document in a feed scanning direction and is featured in that the document-image reading means is further provided with reference-chart reading means for reading a reference chart representing alternations of a low-density or high-density divisions with a width equal to a least readable pitch and a high-density or low-density division with a width equal to an integer-multiple of the least readable width along the feed direction and image-data processing means for separating the high-density divisions and low-density divisions from the read image-data, determining a correction factor by which image data for all low-density or high-density divisions or respective low-density or high-density divisions can be corrected to have a constant value, multiplying the image data by the correction factor, processing the image data read from the reference chart by using a comb filter, performing integral calculations on the filtered data, extracting continuous detection of the substantially same integrated value by the integer number of times and determining an integrated value at the extracted position by reducing an integrated value, said value extracted from uncorrected image data by an integrated value of an upstream point at a distance of the integer-multiple of the least-readable pitch along the feed direction.

This device can therefore analyze the speed fluctuation of the document-image reading means (e.g., a scanning device) even when the white levels of the equal-pitch scale image cannot indicate a constant value due to insufficient adjustment of a signal processing system for an image reading section of the scanner. Furthermore, its calculation load can be lessened since only one correcting value is used for correcting the white levels of the whole image.

The device can also examine the white levels of the equal-pitch scale image data and determine a specified correction value separately for each white portion, by which the portion may be corrected to have a preset constant value. This makes it possible to analyze the speed fluctuation without decreasing the analysis accuracy even if the white level of the scanner varies during a scan.

In this instance, the calculation load increases but the white level is real time measured and a correction value can be immediately determined with no need of waiting until the whole image data are measured. The speed fluctuation analysis result can be, therefore, outputted just after reading the image.

A document-image reading device of the present invention is further featured in that the image-data processing means is provided with processing means for determining a correction factor, multiplying image data by the correction factor, processing the corrected image data with a comb filter and by integration, detecting the substantially same values in succession by the integer-number of times, reducing an integrated value, said value extracted from the uncorrected image data, by an integrated value found at a upstream point in the feed direction at a distance of the integer-multiple of the least readable pitch and determining the reduced value as an integrated value of the extracted point.

The device uses corrected data only for determining the conditions of the speed fluctuation analysis and uses uncorrected data for determining speed fluctuation, then determines correction coefficients that make all white (or black) portions have a constant value. It can therefore realize higher accuracy of the speed fluctuation analysis and less amount of calculation. The real time processing is also possible by determining correction values for respective white (or black) portions although the calculation amount increases.

A document-image reading device of the present invention is further featured in that image-data processing means processes image data with a comb filter followed by calculation of absolute values of the filter-processed data and temporarily store the processing result in storing means, and, at the same time, performs processing a read image of a reference chart with a comb filter and by integration, detects the substantially same values in series by the integer-multiple times, reducing an extracted integrated value by an integrated value found at the upstream-side point in the feed direction at a distance of the integer-multiple of the least readable pitch, determines the reduced value as an integrated value of the extracted point by setting 1 for a positive resultant, 0 for a zero resultant and −1 for a negative resultant, then multiplies the resultant values by the processed results temporarily stored in the storing means.

The device calculates speed fluctuation by using absolute values of the resultant data obtained by processing the output of A/D converter with a comb filter. Consequently, the finally obtained result of analysis may reflect each part changing from a white portion to a black portion and/or each part changing from a black portion to a white portion and, therefore, can attain increased accuracy.

The processing may also be conducted after correction of white shading for all image data by using the same correction factor. By doing so, the speed fluctuation analysis can be done even if the white levels of the equal-pitch scale did not meet a constant value due to insufficient adjustment of an image-reading signal-processing system of the scanner. Furthermore, the white level of the equal-pitch scale image-data is corrected by using only one correction value for a whole image, thus achieving the saved amount of calculation.

A document-image reading device of the present invention is further featured in that absolute values obtained by processing with a comb filter before shading correction are used for multiplication.

Accordingly, the corrected values are used only for separating white portions from black portions and the uncorrected data is used for calculation of the speed fluctuation. The device can therefore attain high accuracy of analysis.

The device can determine correction factors for correcting respective white line portions to have a full-bit output of an A/D converter and can separately correct the respective portions with corresponding correction factors since the corrected values are used only for separation of white portions from black portions and not-yet-corrected data is used for calculating the speed fluctuation.

Therefore, this device can accurately analyze the speed fluctuation even if the shading level varies during scanning operation, attaining high accuracy of analysis.

PREFERRED EMBODIMENTS OF THE INVENTION

A flow chart of the present invention is described below with reference to accompanying drawings.

A scanner having a flat bed for placing thereon a document and a charge coupled device (CCD) for reading the document image will be employed for the sake of explanation of the present invention and is not intended to limit the scope and aspects of the present invention.

It is of course possible to embody the present invention as various kinds of document reading devices which can read an entire or a specified image area of a document 1 with a document reading mechanism using a line sensor 10 or the like by moving the document or the reading mechanism. Examples are digital devices such as copying machines, facsimiles and scanners.

Figure 1:
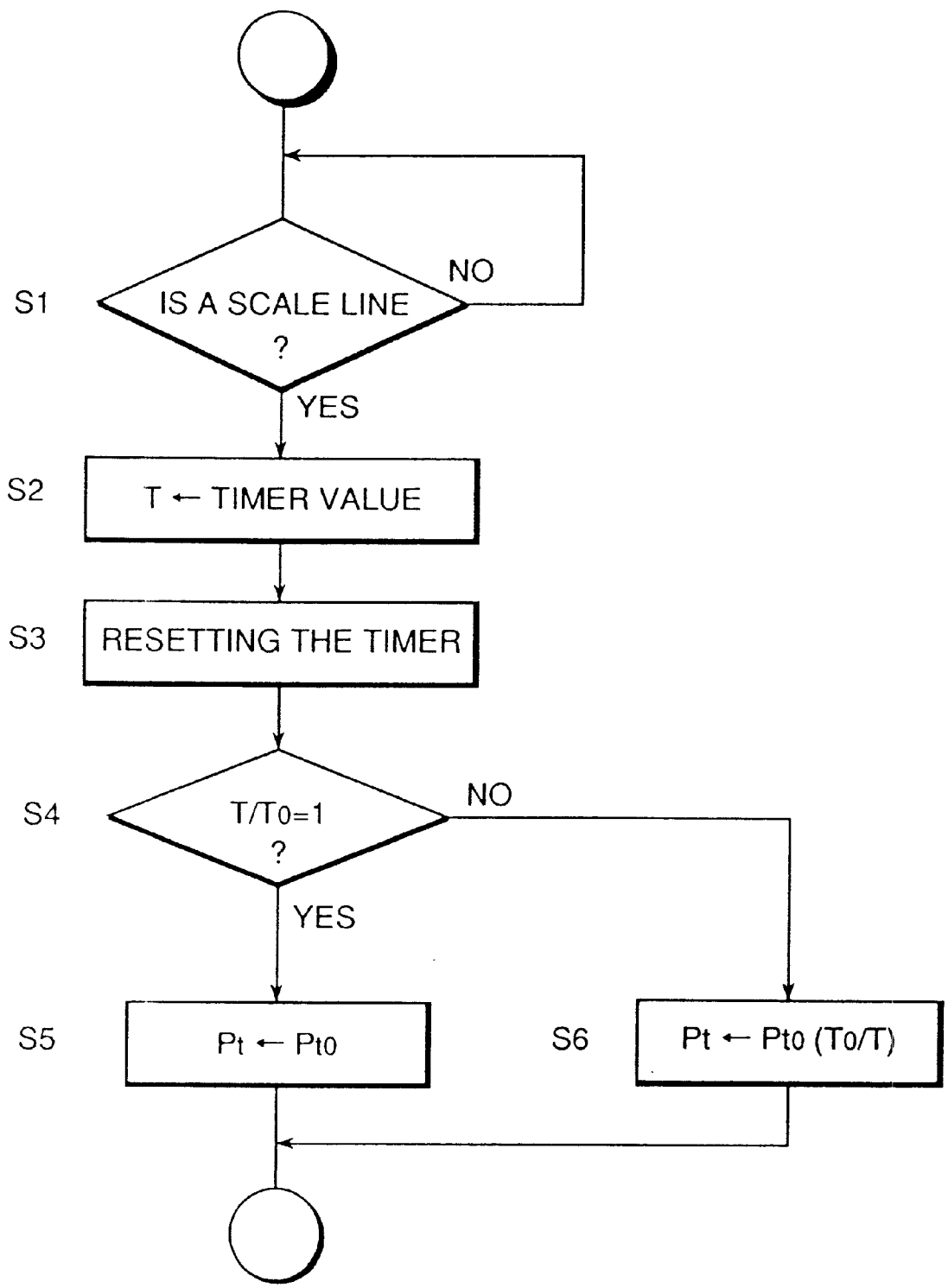
FIG. 1 is a flow chart of a prior art.
Figure 2:
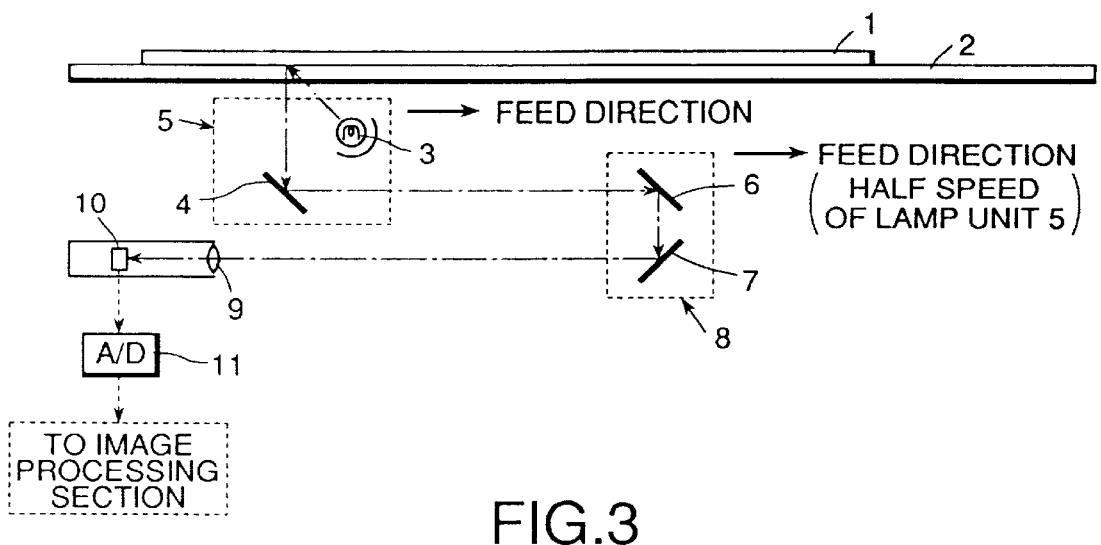
FIG. 2 is a view showing a construction of an image reading device embodying the present invention.
Figure 3:
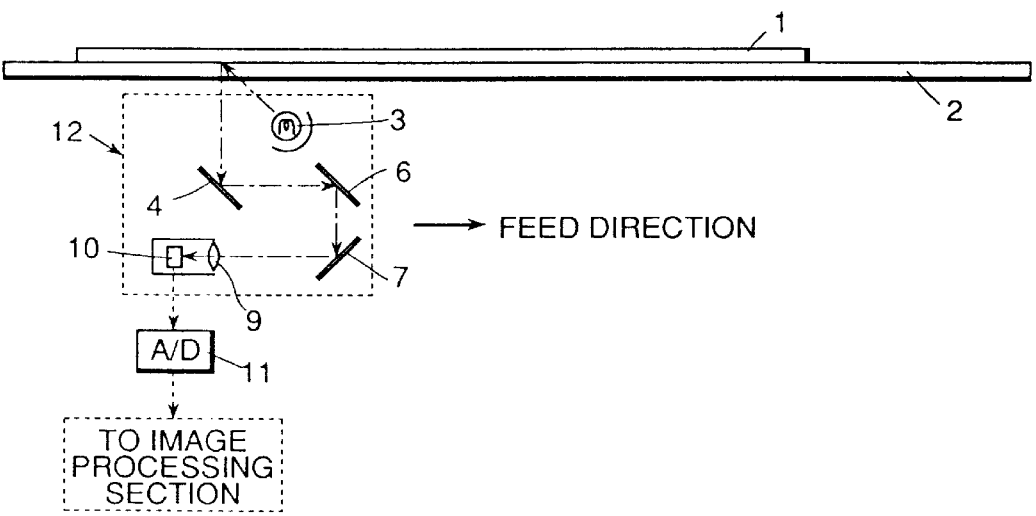
FIG. 3 is a view showing a construction of an image reading device embodying the present invention.
Figure 4:
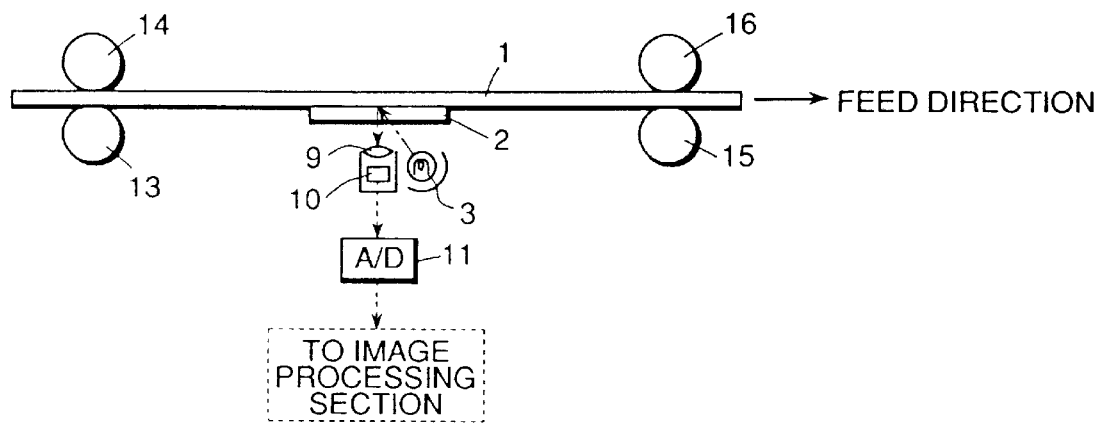
FIG. 4 is a view showing a construction of an image reading device embodying the present invention.

FIG. 2 shows the construction of an image reading means used in a scanner or a copying machine having a flat bed for placing a document thereon.

The document reading device is switched on after placing a document 1 is placed on the flat bed (glass plate) 2. A light source 3 switched on and a lamp unit 5 moves from the left to the right as shown in FIG. 2. (This direction is the feed direction of a line sensor 10 to be described later.)

Simultaneously, a mirror unit 8 consisting of a second mirror 6 and a third-mirror 7 moves in the same direction at a speed corresponding to a half speed of the lamp unit 5, maintaining a constant distance between the document bed 2 and the line sensor 10.

Light emitted from the light source 3 irradiates the document 1 and then travels the first mirror 4, second mirror 6, third mirror 7 and a lens 9 and reaches the line sensor 10 as shown by arrows.

The line sensor 10 converts image information of the document 1 into an electric signal which is then converted by an A/D converter 11 into a digital signal and transmitted to an image processing section.

Figure 5:
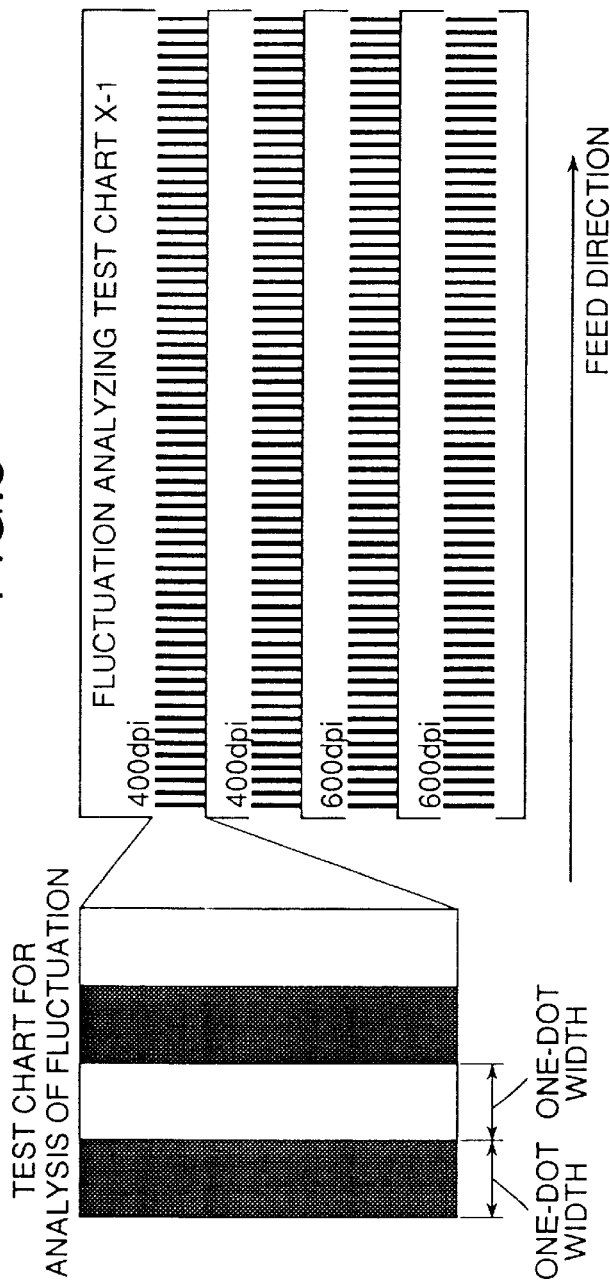
FIG. 5 is illustrative of an image analyzing chart 17 for an embodiment of the present invention.
Figure 6:
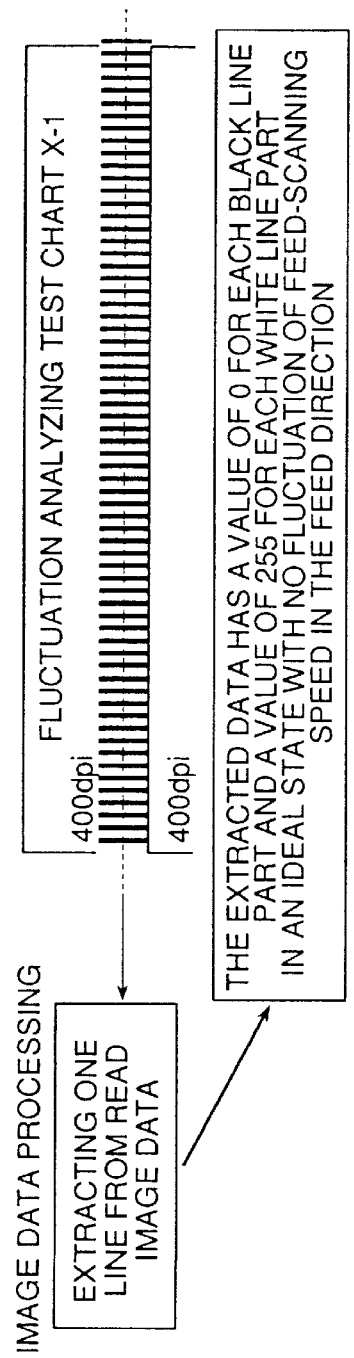
FIG. 6 is a conceptual illustration of a technique applied in an embodiment of the present invention.
Figure 7:
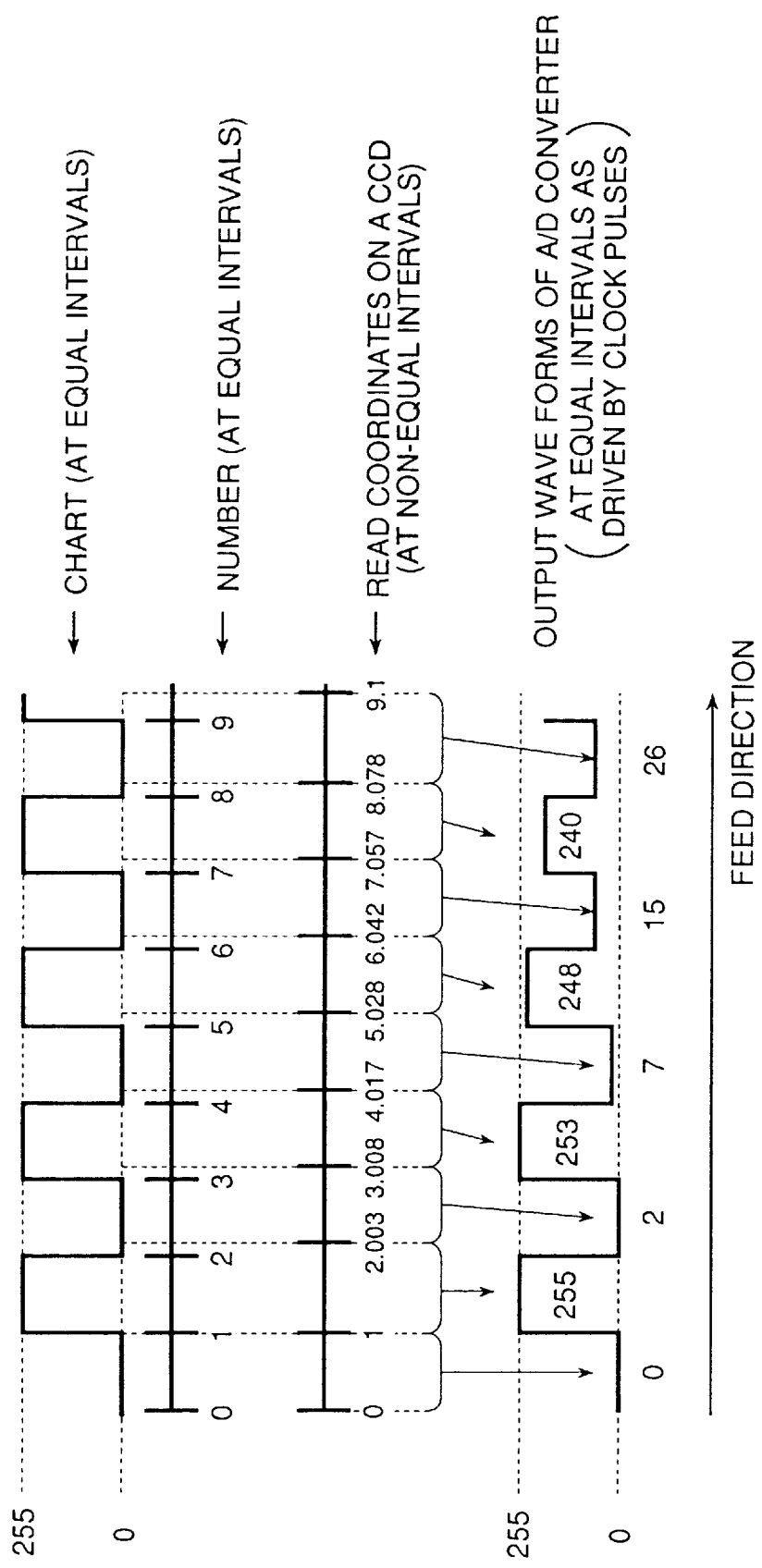
FIG. 7 depicts a time relation of signals in an embodiment of the present invention.

Referring to FIGS. 5 to 7, the affection of the speed fluctuation of the document image reading means while reading a chart 17 having alternating white and black lines of the same width is described as follows:

FIG. 5 illustrates a speed fluctuation analyzing chart 17 showing alternations of white line of 1 pixel thick and black line of 1 pixel thick. Another chart may be used if the line sensor 10 can have two kinds of distinctive outputs (densities) even if the scanning speed varies. For example, a chart having, as high-density parts, halftone lines instead of black lines.

The chart 17 is read by the image reading means in such a way that the longitudinal direction of the chart may meet with the feed direction of the image reading means.

Data by one pixel in the main scanning direction and by one line in the feed direction is extracted from the read image-data of the chart 17 as shown in FIG. 6. In this instance, the image-data output from the A/D converter 11 (8 bits) may show an ideal arrangement of alternating white (value "255") and black (value "0") lines.

The image-reading means (CCD) varying its scanning speed fluctuation in the feed direction cannot distinguish between the white line and the black line. It reads a part of a white line and a part of a black line at the same time.

As the result of the above, white line value "255" and black line value "0" may be, for example, of "248" and "7" respectively by being affected speed fluctuation. The changes of the optical density values of the read image were resulted from the scanning speed fluctuation of the image reading means in the feed direction.

The present invention is intended to analyze the speed fluctuation of the image reading means in the feed direction by detecting variations of the optical density values of the chart image.

[First Embodiment of the Present Invention]

Figure 8:
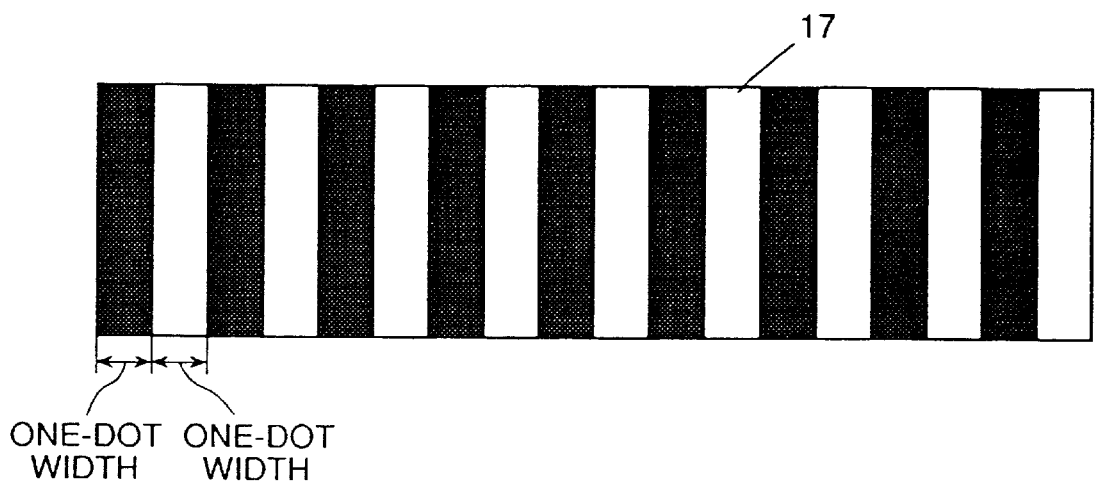
FIG. 8 shows a construction of an image analyzing chart 17 used in an embodiment of the present invention.
Figure 9:
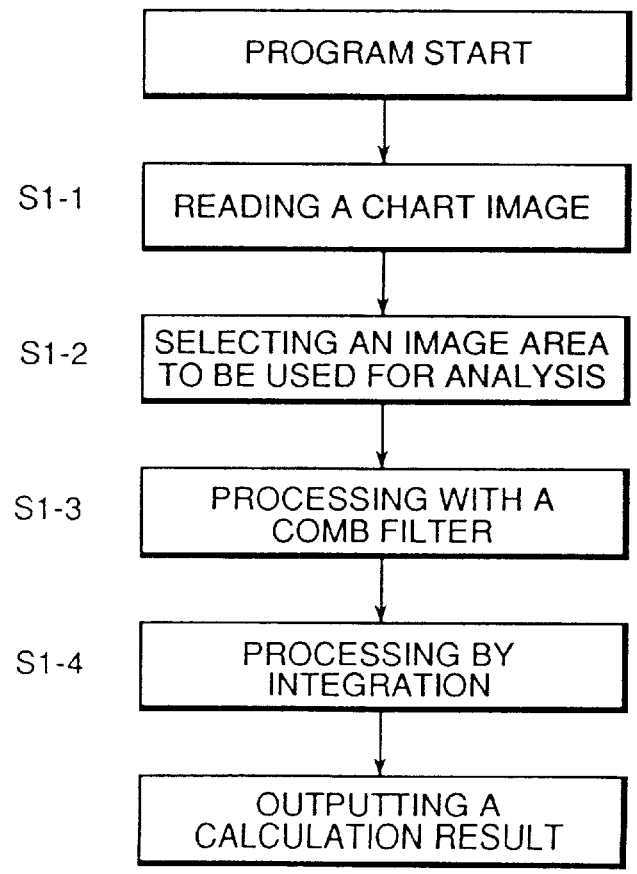
FIG. 9 is a flow chart of an embodiment of the present invention.

FIG. 8 shows a format of an analysis chart 17 used in the first embodiment of the present invention and FIG. 9 shows a read-image processing flowchart.

This embodiment uses the chart 17 having alternations of a white line and a black line, each line having width of 1 pixel dot of a CCD, as shown in FIG. 8. The chart has a standard width of 400 dpi or 600 dpi for the image reading devices. Charts of other widths, e.g., higher-resolution type or other resolutions, can be also used in the same manner.

An image of the chart 17 is read by image reading means (to be analyzed). An output of the CCD of the image reading means is converted by an A/D converter 11 into a digitized image. The data of the digitized image is processed by conducting operations according to the flowchart of FIG. 9 to obtain an analysis result.

Referring to FIG. 9, the processing is described in detail as follows:

At Step S1-1, the image-reading means reads the analysis chart 17 and the A/D converter 11 converts the read data into digital data.

At Step S1-2, only image-data read through any one of many pixels in the CCD is extracted from all the read image-data.

The same result can be obtained when any of the CCD pixels is initially aimed and the data digitized through A/D conversion of that CCD pixel output is directly used.

Consequently, the extracted data has a width of 1 pixel (dot) in main scanning direction of the CCD and a length of any selected number of pixels.

The extracted image data includes image data containing a speed fluctuation component. Therefore, the initial chart data must be removed from the obtained image data to extract only the speed fluctuation component.

At Step S1-3, the initial chart data is removed from the extracted image data by using a comb filter. In this embodiment, the data extracted at Step S1-2 is processed with a two-dot cycle comb filter according to the following expression:

R1=D(n−1)−D(n), where R is a calculation result and D(n) is image data existing at n-th position from the top.

At the same step, an obtained value of the speed fluctuation is converted into a value in percentage according to the following equation:

$$R2 = -100 \text{ Gv } R1/(2^n)/C,$$

where n is the number of bits of the A/D converter 11 and C is a cycle of the chart 17.

At Step S1-4, the calculation resultant values of Step S1-3 are summed (integrated) from the top.

The speed fluctuation component of the image reading means is separately extracted by the above calculation.

The above operation process is explained according to a simulation analysis.

Figure 10:
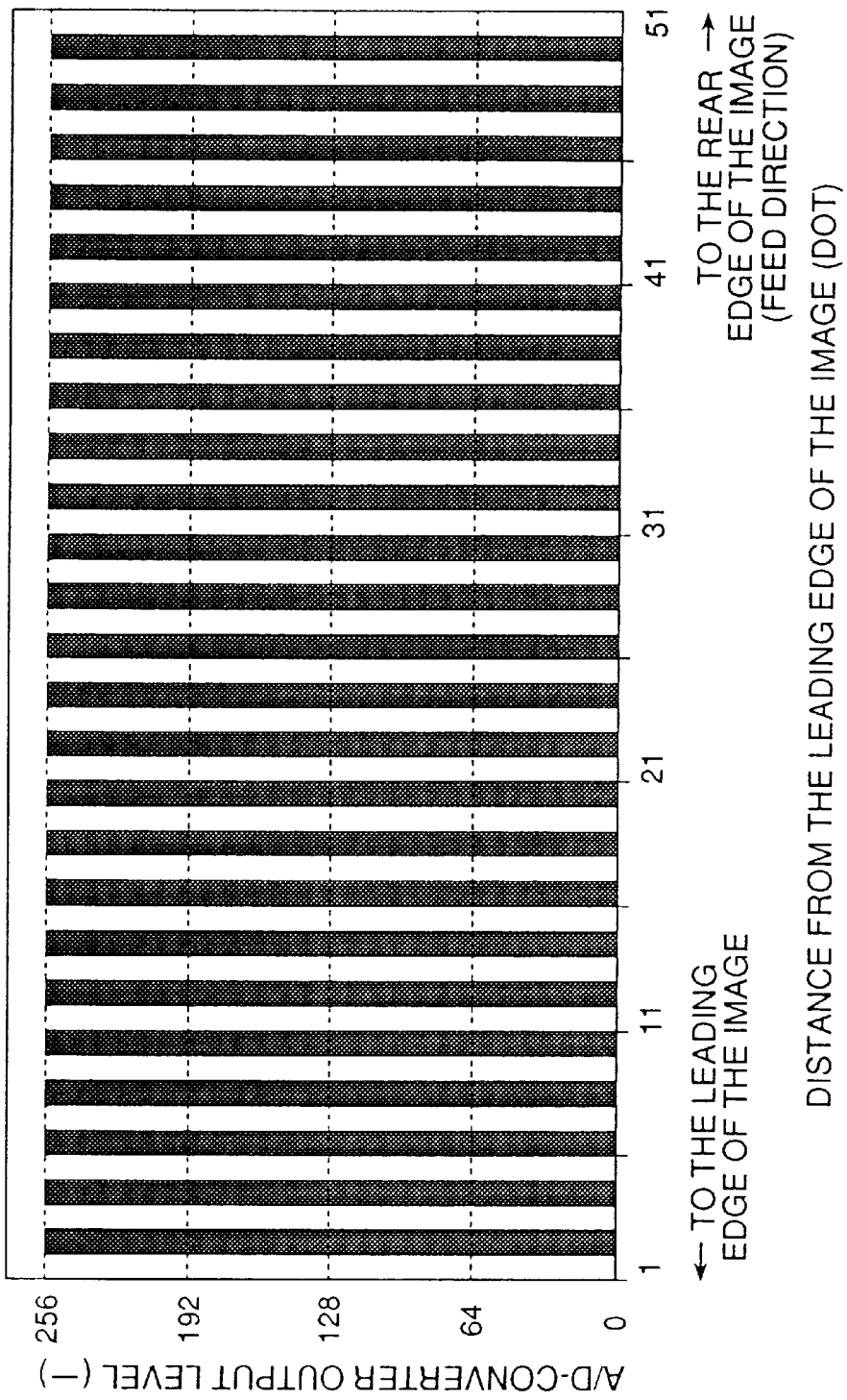
FIG. 10 depicts simulation data representing a basic concept of an embodiment of the present invention.

FIG. 10 shows the optical density variation of the chart 17 of FIG. 8 in the feed direction.

Figure 11:
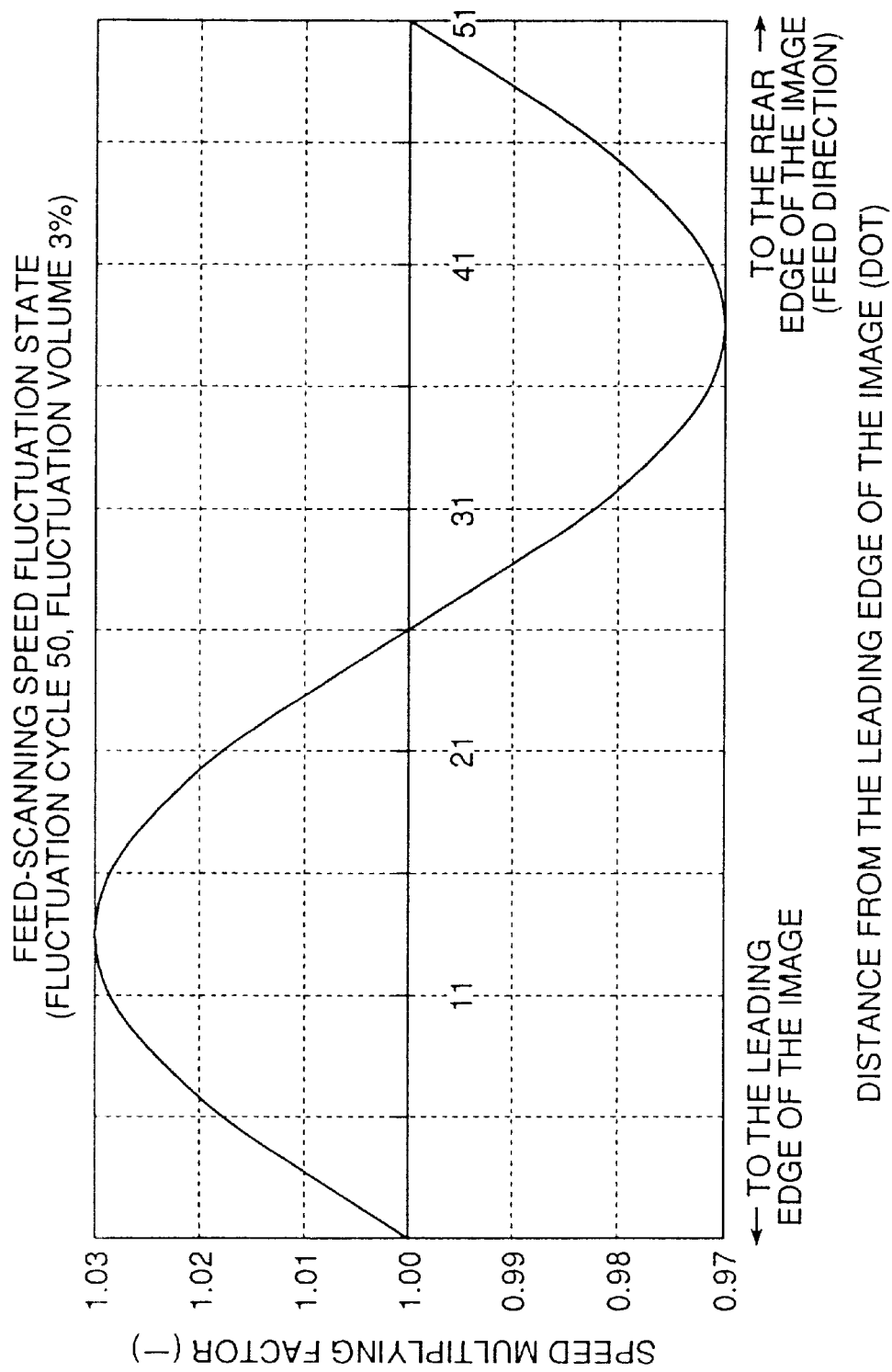
FIG. 11 depicts simulation data representing a basic concept of an embodiment of the present invention.
Figure 12:
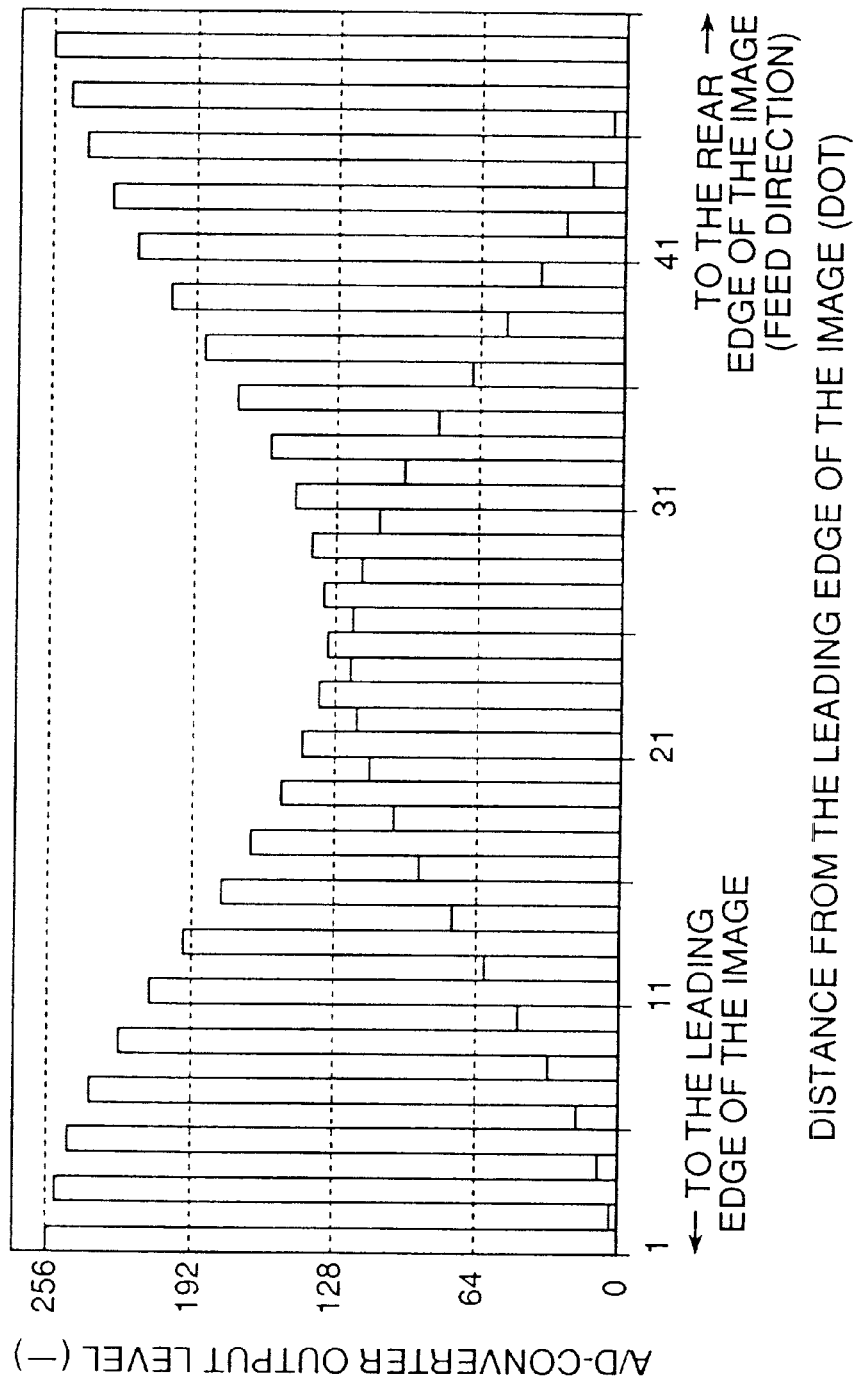
FIG. 12 depicts simulation data representing a basic concept of an embodiment of the present invention.
Figure 13:
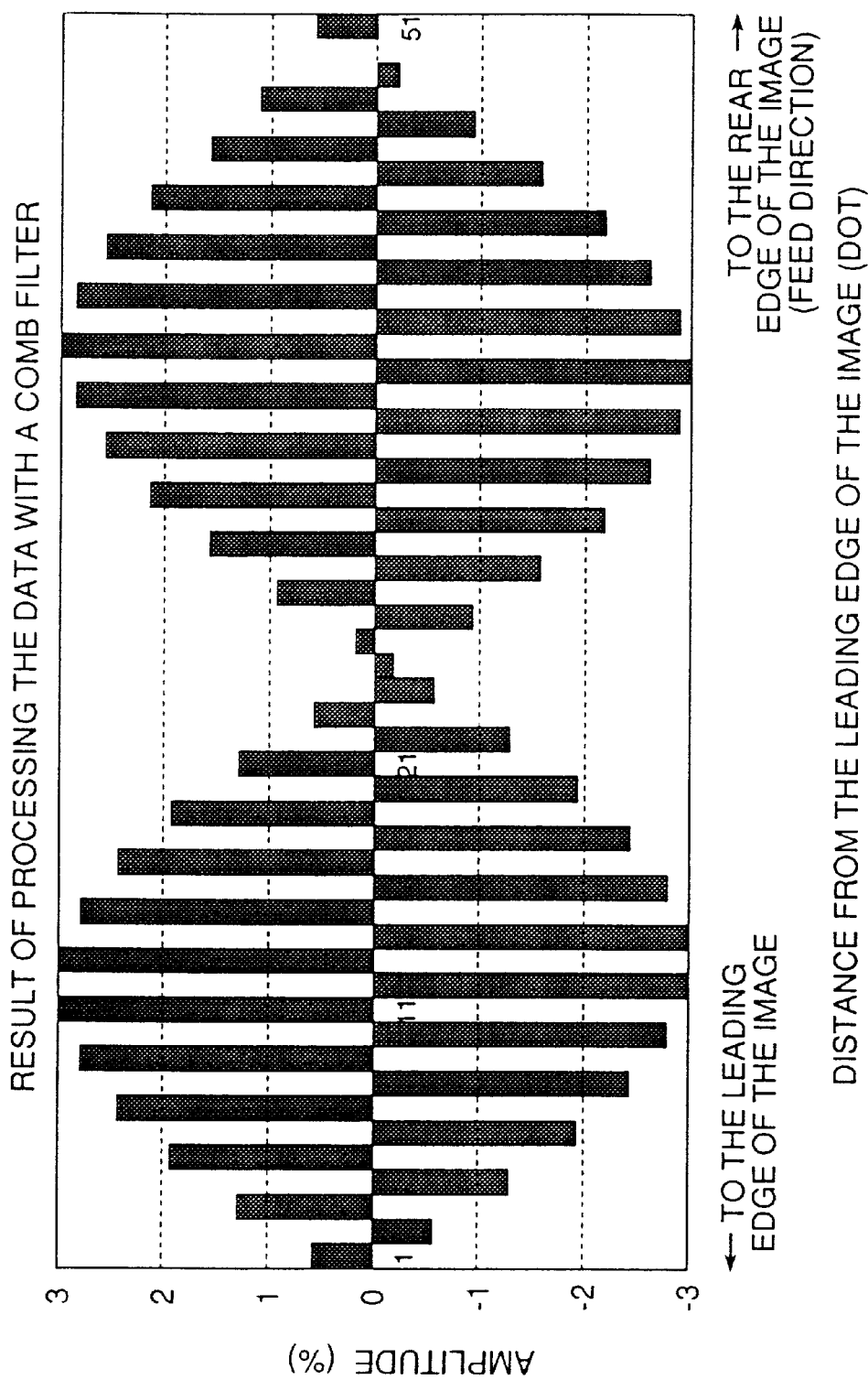
FIG. 13 depicts simulation data representing a basic concept of an embodiment of the present invention.

If the image reading means has speed fluctuation as shown in FIG. 11 when scanning an image in the feed direction, the A/D converter outputs density variation of the read chart image as shown in FIG. 12. The output is processed with a comb filter (Step S1-3 in FIG. 9) to obtain a result as shown in FIG. 13.

Figure 14:
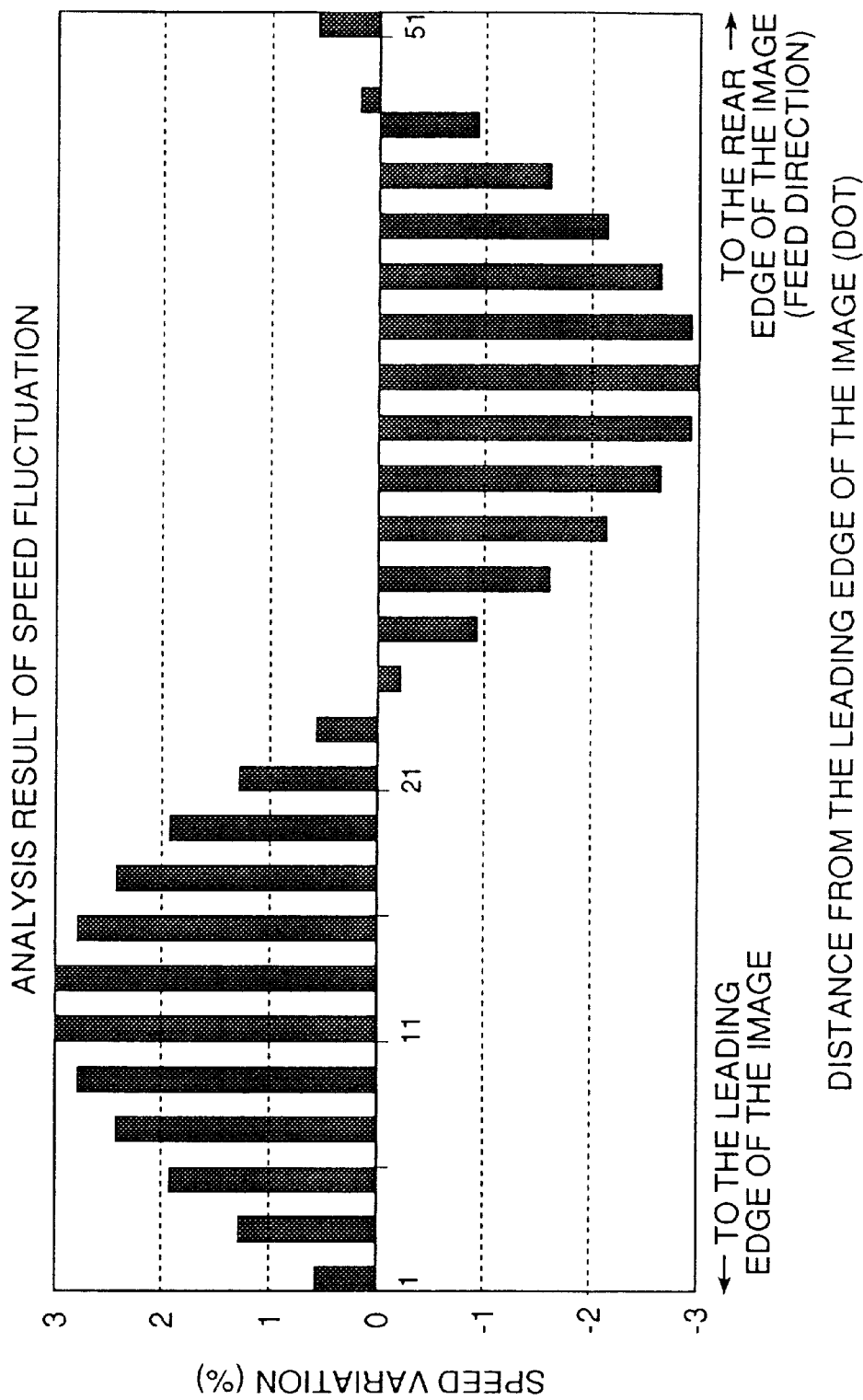
FIG. 14 depicts simulation data representing a basic concept of an embodiment of the present invention.

The obtained result of FIG. 14 is further processed by Step S1-4 (FIG. 9) for extracting speed fluctuation components. (It is apparent from the comparison of FIG. 11 with FIG. 14 that extracting speed fluctuation has attained by processing image data.)

[Second Embodiment of the Present Invention]

The second embodiment of the present invention uses another analysis chart 17 which is different from that used in the first embodiment. Accordingly, the flowchart of FIG. 9 cannot be directly applied to the second embodiment.

Figure 15:
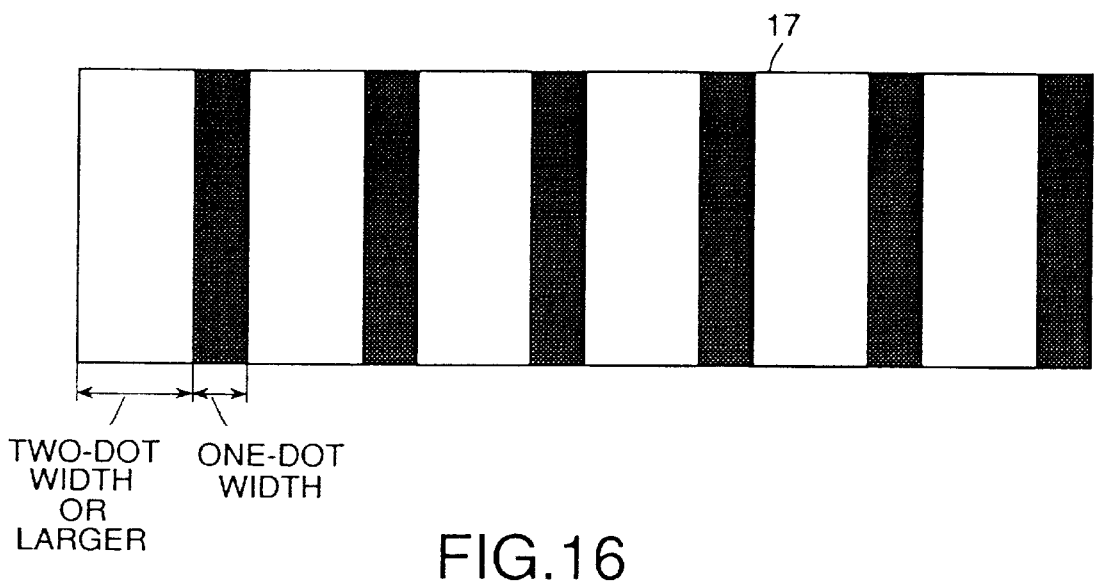
FIG. 15 shows a construction of an image analyzing chart 17 used in an embodiment of the present invention.
Figure 16:
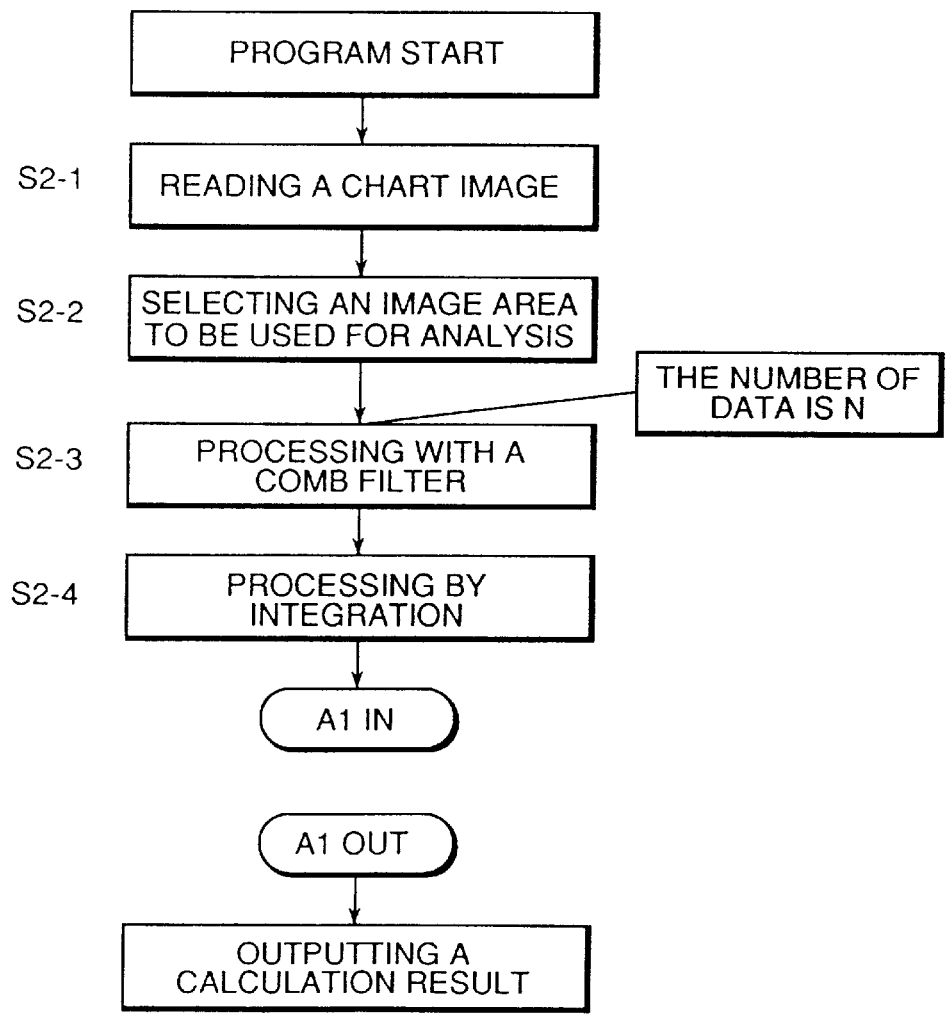
FIG. 16 is a flow chart of an embodiment of the present invention.
Figure 17:
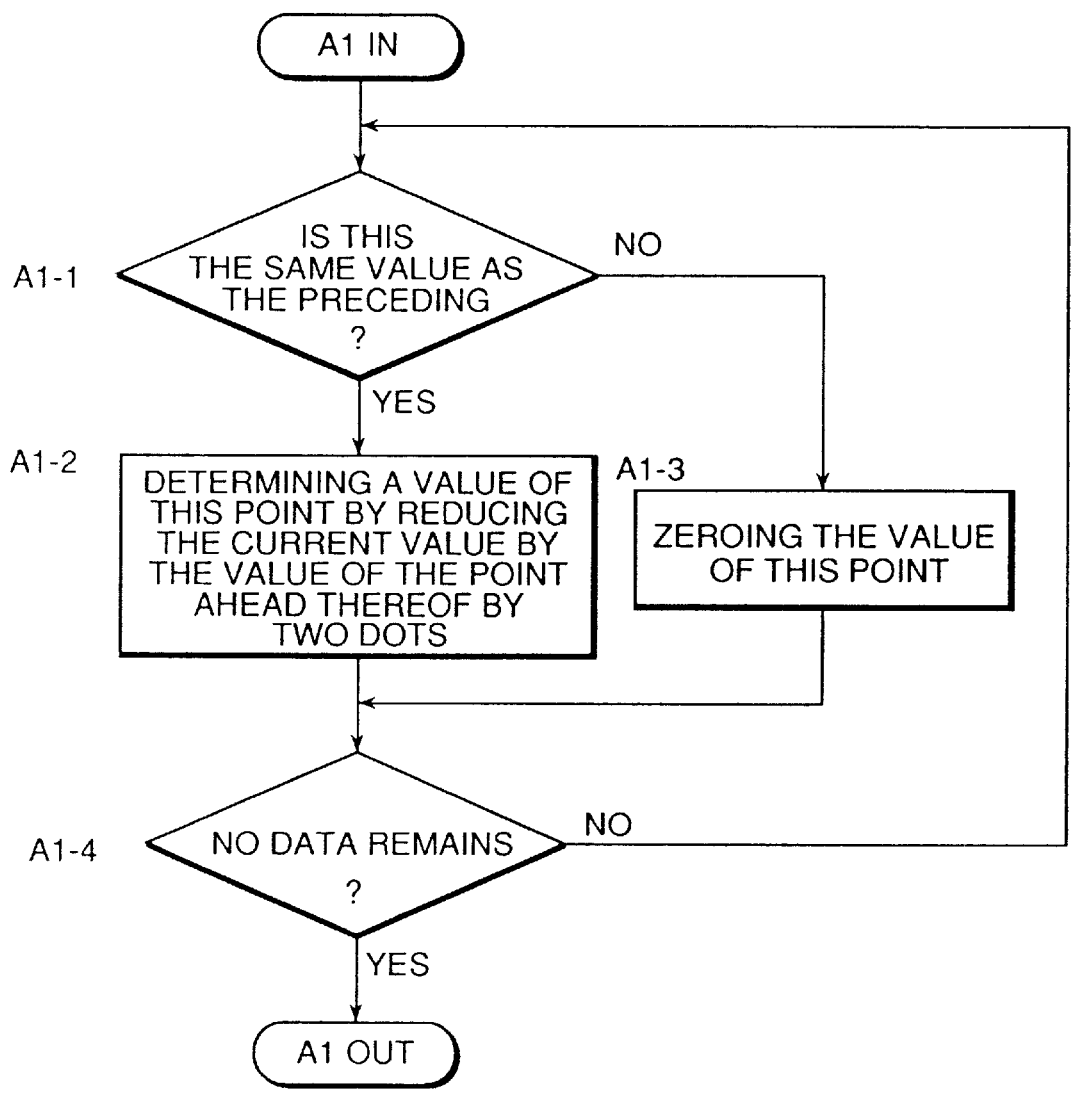
FIG. 17 is a flow chart of an embodiment of the present invention.

FIG. 15 shows a format of an analysis chart 17 used in the second embodiment of the present invention and FIGS. 16 and 17 show a flowchart for processing a read chart image.

The chart 17 shown in FIG. 15 has alternations of a black line having width of 1 dot and a white line having width of not less than 2 dots. It is of course possible to use a chart having one-dot-thick white lines and two-dot-thick black lines.

Referring to the flow charts of FIGS. 16 and 17, the operation of the second embodiment is described below in detail. However, Steps S2-1 to S2-4 are omitted from the description since they are the same as Steps S1-1 to S1-4 of the first embodiment.

Figure 18:
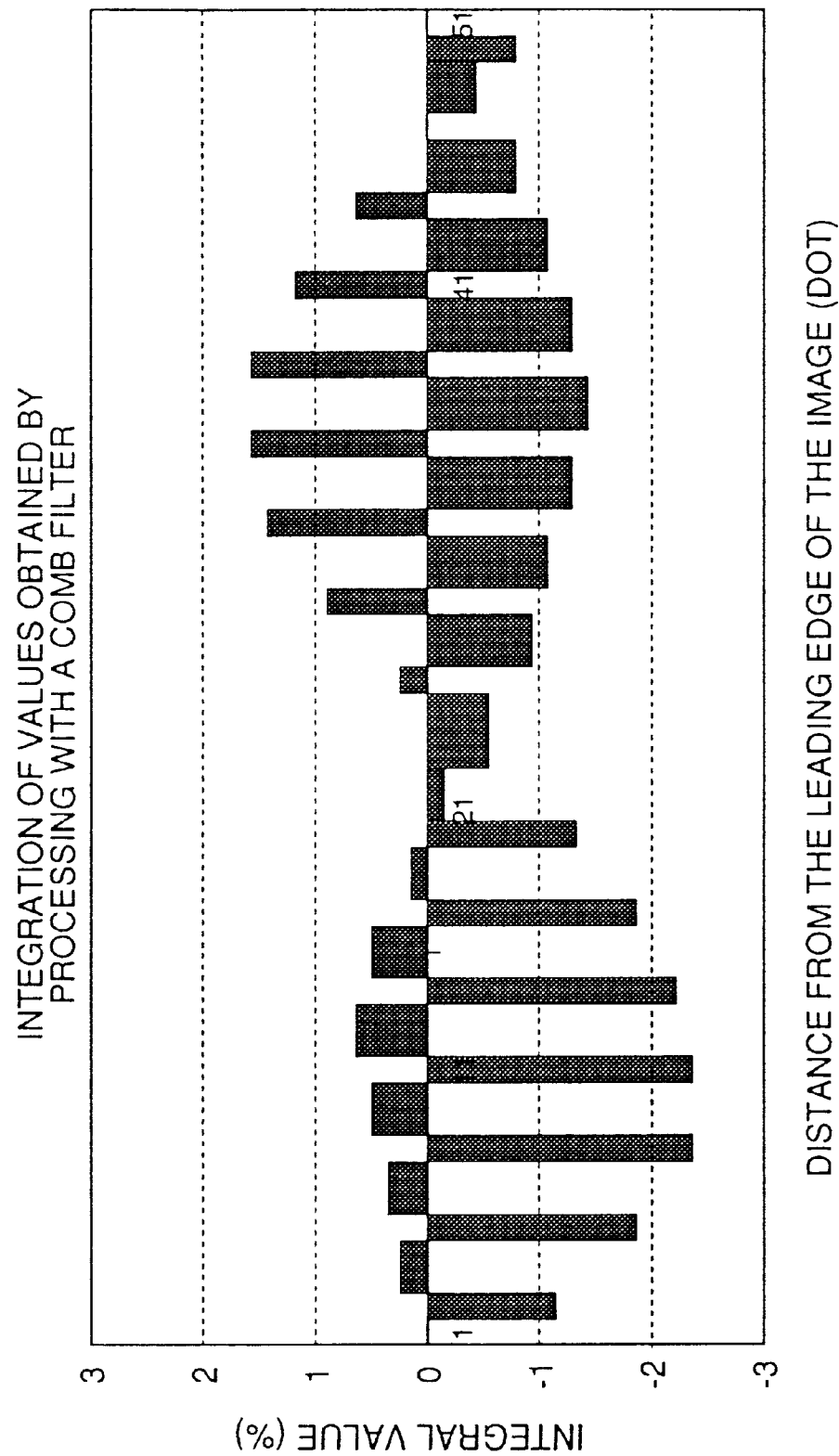
FIG. 18 depicts an analyzing method used in an embodiment of the present invention.

After Step S2-4, steps A1-1 to A1-4 of FIG. 17 are performed to obtain an output of an analysis result. At Step A1-1, a portion having the same values appeared not more than twice is detected among the integration results of Step S2-4 (FIG. 16). The portion is recognized as a white line (of not less than two-dots in width) of the analysis chart 17. This can be easily understood from FIG. 18.

At Step A1-2, a value ahead by two dots from the recognized portion (i.e., a value just before a series of two same values) is subtracted from the value of the recognized portion and an obtained difference is recorded as an analysis value of the recognized position.

Figure 19:
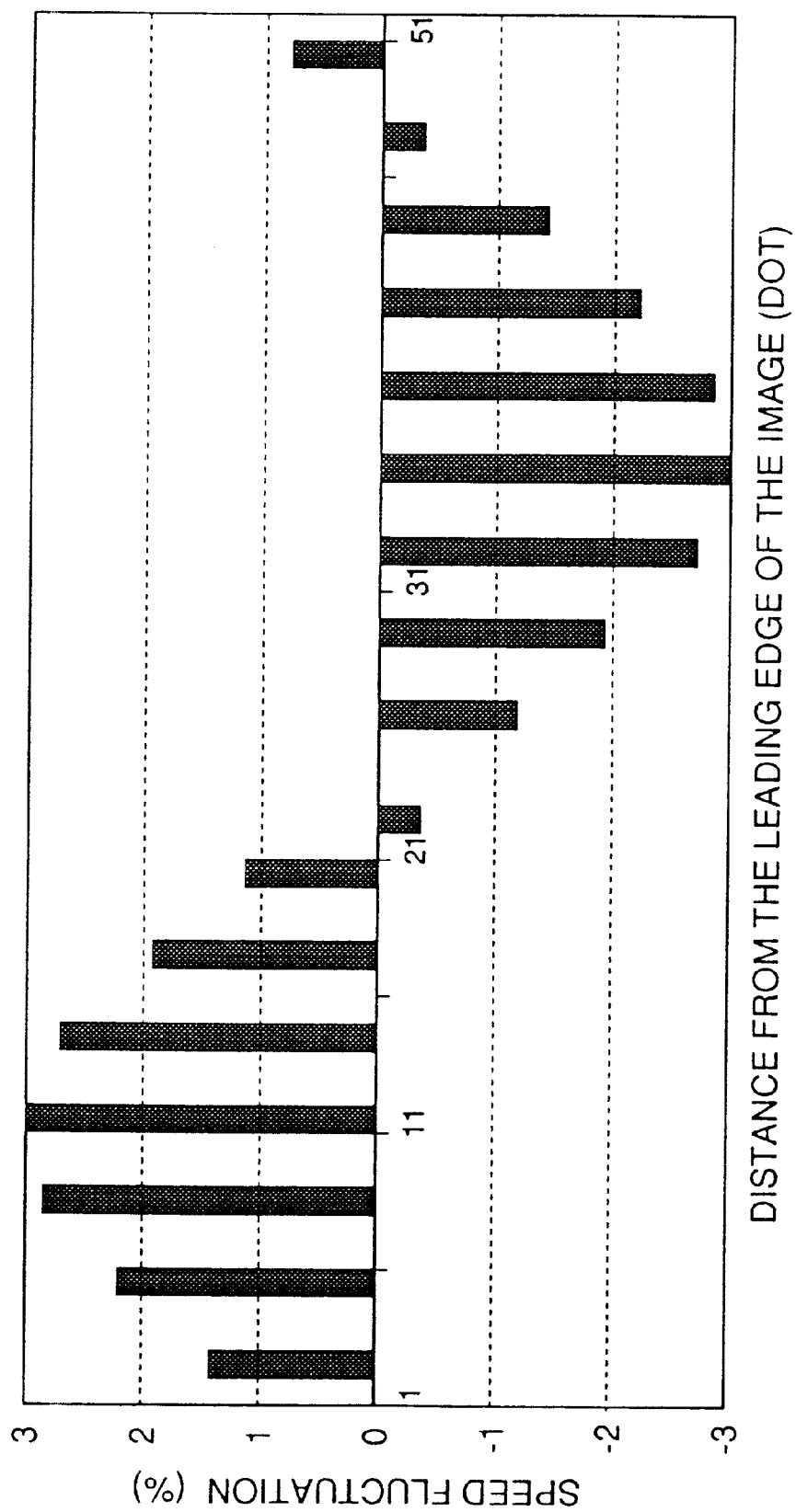
FIG. 19 depicts an analyzing method used in an embodiment of the present invention.

If the same values did not appear twice in series (at Step A1-1), the Step A1-3 determines an analysis value of this position to be zero. This operation brings the analysis result as shown in FIG. 19. The comparison of FIG. 19 with FIG. 11 clearly shows that the use of the chart 17 of FIG. 15 can also extract components of the scanning speed fluctuation.

Thus, the second embodiment achieves the analysis of scanning speed fluctuation of the image reading means.

[Third Embodiment of the Present Invention]

The third embodiment uses the same analysis chart 17 as used in the second embodiment.

The operation of this embodiment will be described below according the flow charts of FIGS. 20 and 21. However, Steps S3-1 to S3-4 are omitted from the description since they are the same as Steps S2-1 to S2-4 of the second embodiment. Namely, a subroutine A2 to be performed between Steps S3-2 and S3-3 is explained as follows:

The subroutine A2 consists of Steps A2-1 to A2-6. Step A2-1 detects positions of black lines on a read image of the chart by performing differential calculation with the output of Step S3-2. The resultant data represents an arrangement of discretely disposed blocks of white line portions since the initial chart image represents alternations of a black line and a white line. (The black line data exists between respective white blocks.)

Figure 22:
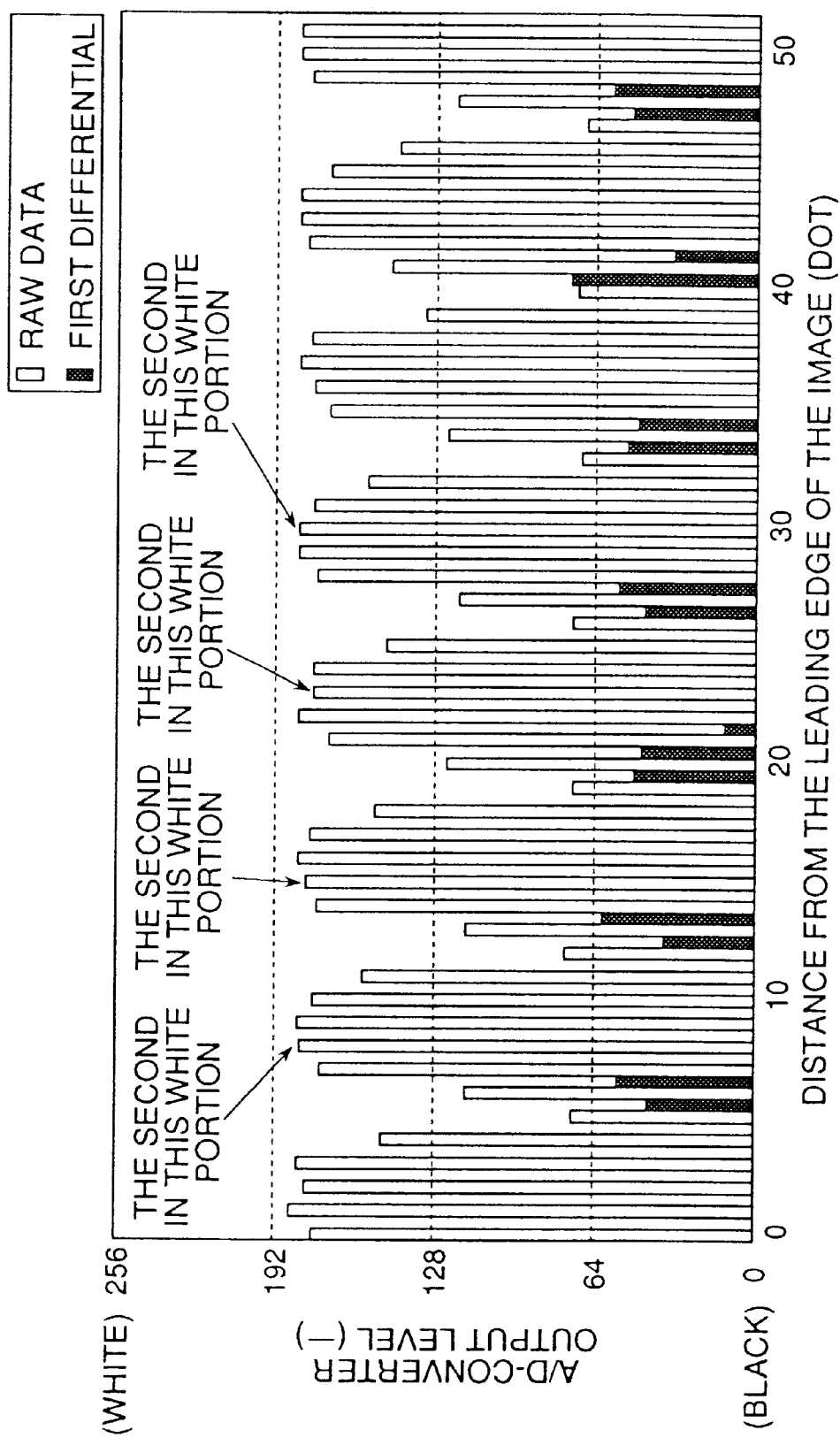
FIG. 22 depicts an analyzing method used in an embodiment of the present invention.

Step A2-2 extracts a portion having the second value of magnitude from the respective white-block data and stores it. If there are two equal peaks, the same value is stored. The operation result is shown in FIG. 22.

Step A2-3 detects the least of the values of all blocks stored by Step A2-2. (The detected value is stored as a value "Wmin".) This means the detection of the least value other than zeros.

Figure 24:
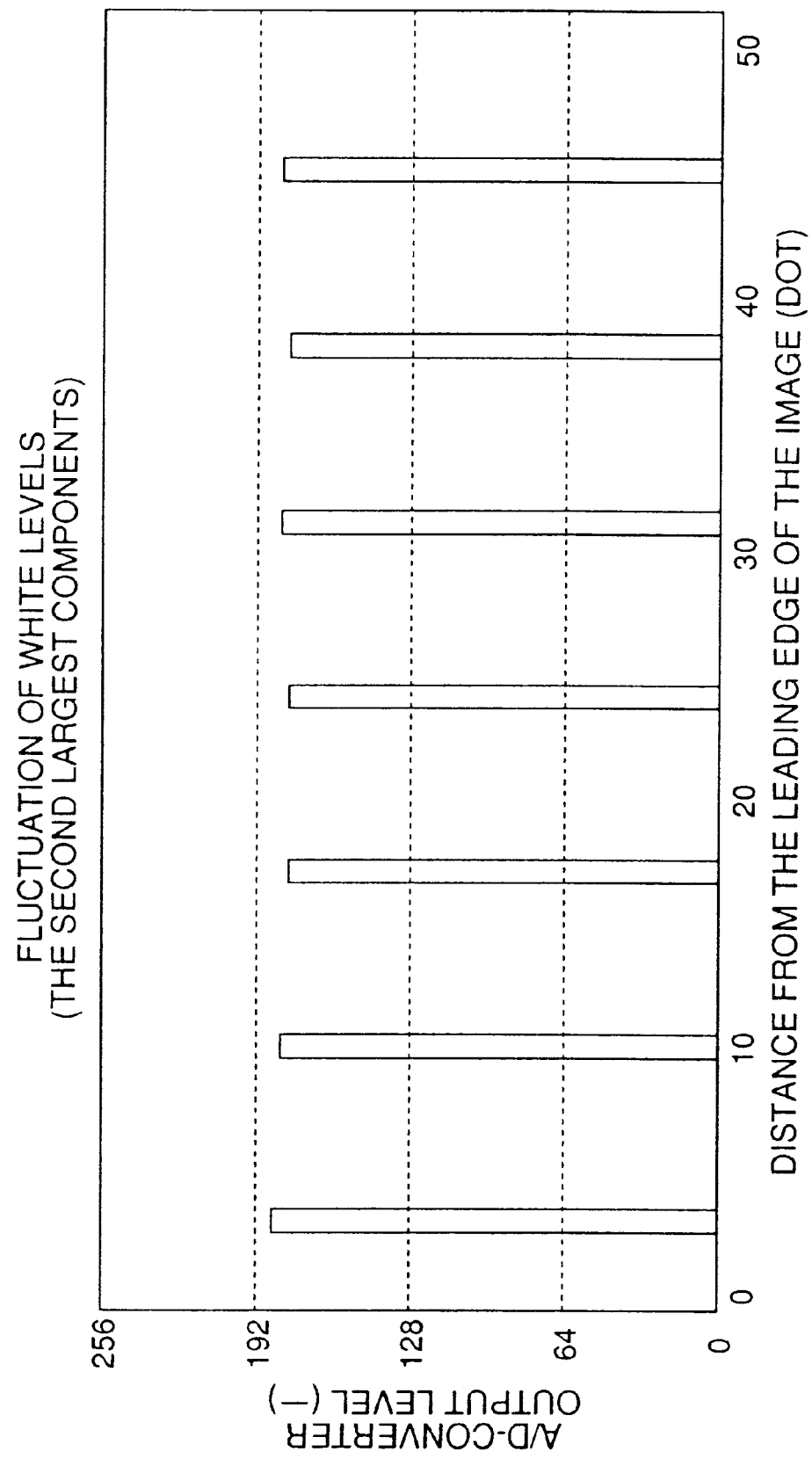
FIG. 24 depicts an analyzing method used in an embodiment of the present invention.

After this, the steps A2-4 to A2-6 of the subroutine are performed and then the processing of Step S3-3 (FIG. 20) is executed to obtain the final analysis result (see FIG. 24).

[Fourth Embodiment of the Present Invention]

Figure 25:
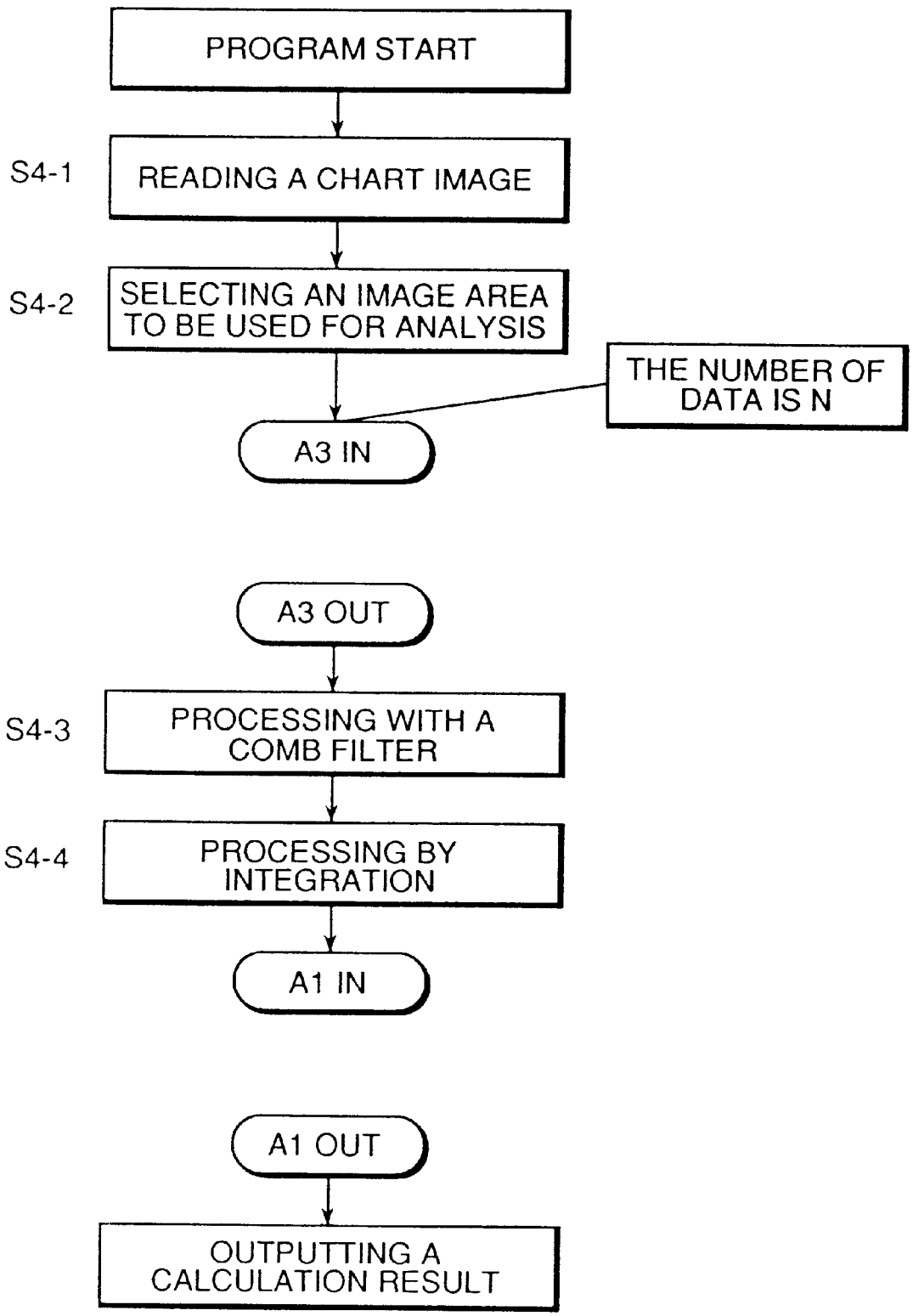
FIG. 25 is a flow chart of an embodiment of the present invention.
Figure 26:
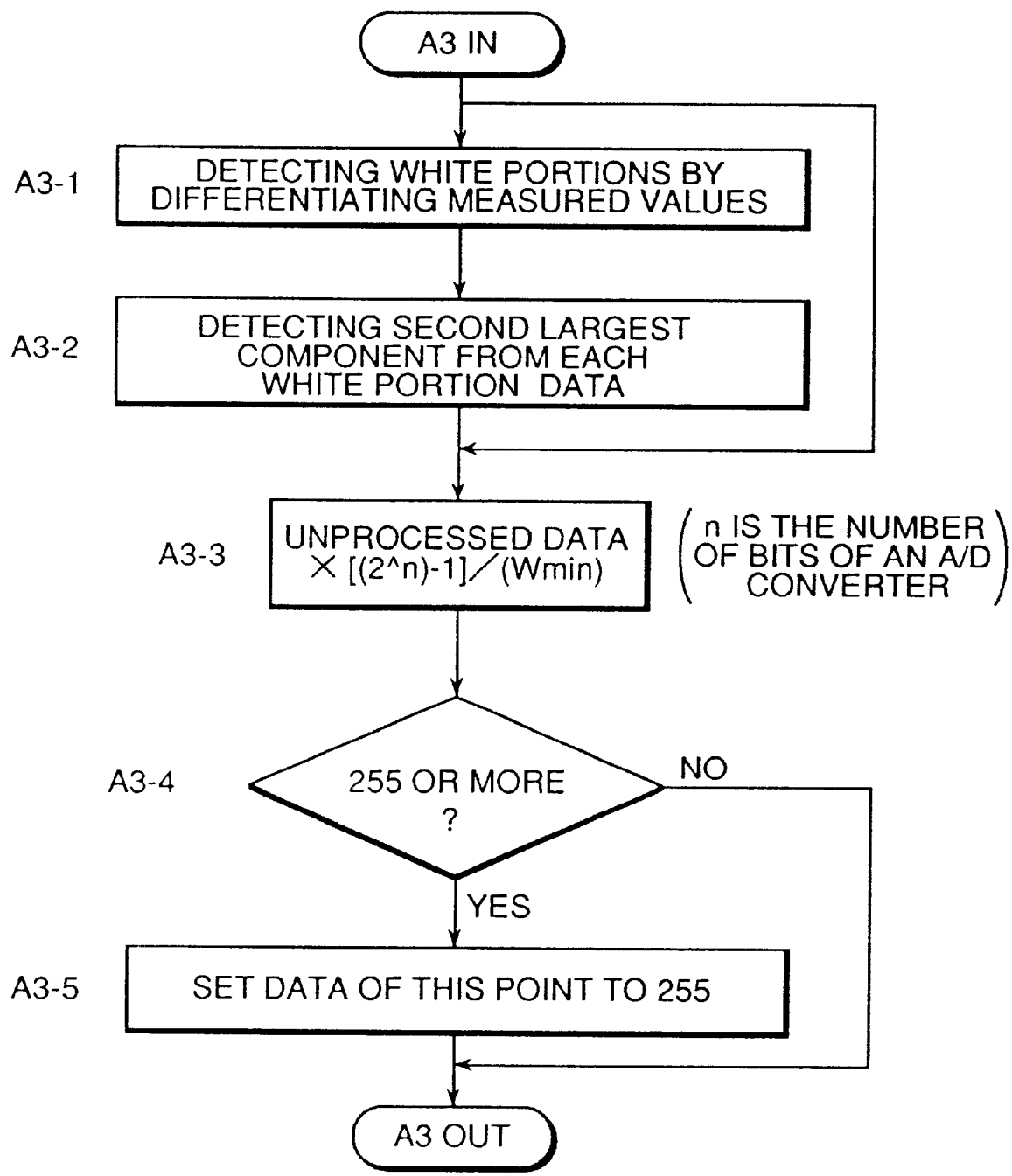
FIG. 26 is a flow chart of an embodiment of the present invention.

The operation of the fourth embodiment will be described below in detail according the flow charts of FIGS. 25 and 26. However, Steps S4-1 to S4-4 are omitted from the description since they are the same as Steps S1-1 to S1-4 of the first embodiment.

A subroutine A3 consists of Steps A3-1 to A3-5. Step A3-1 and A3-2 are identical to Steps A2-1 and A2-3 respectively, So, they will not be further described.

Figure 23:
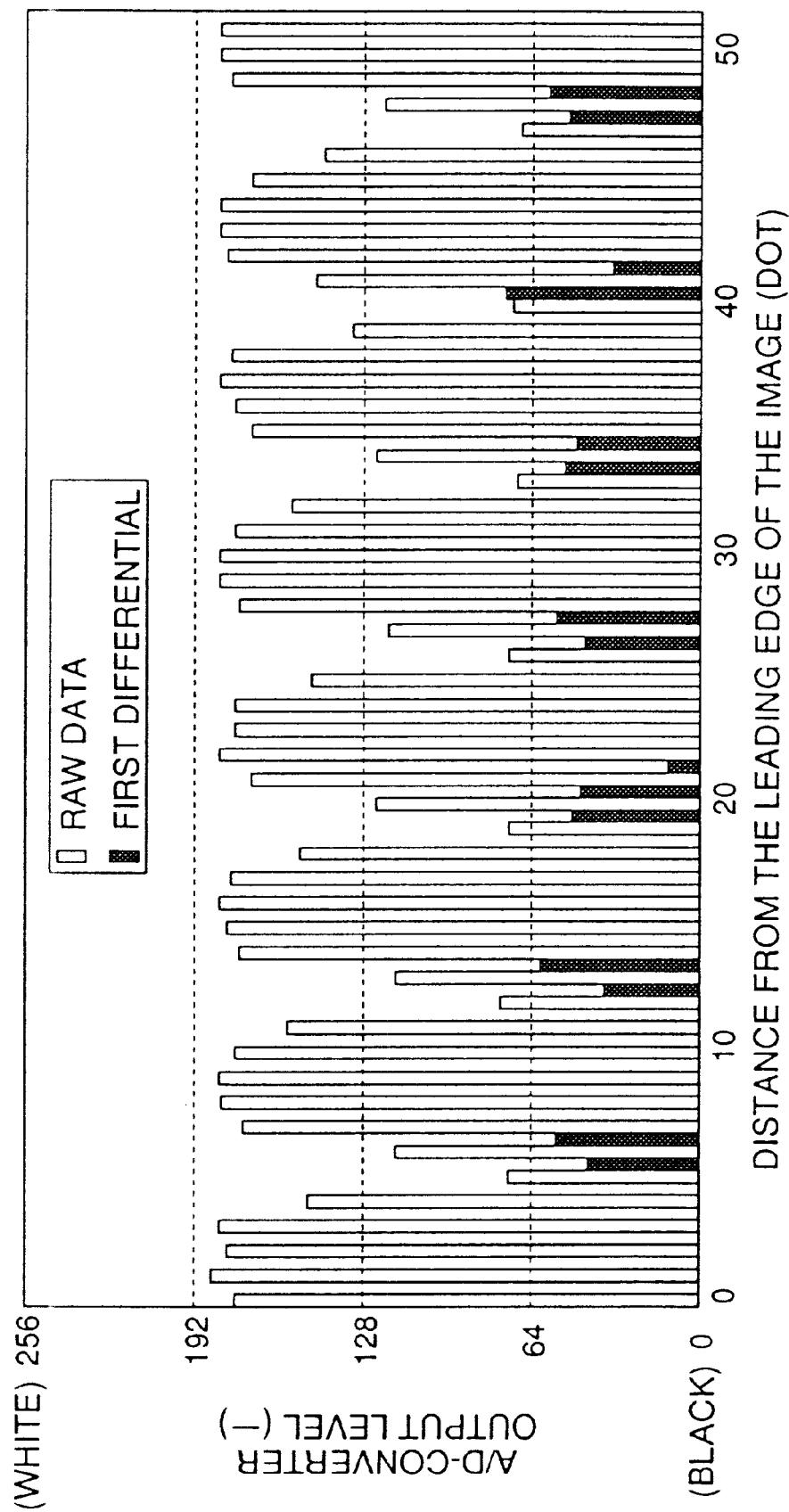
FIG. 23 depicts an analyzing method used in an embodiment of the present invention.

While the third embodiment uses only the least of the values of shown in FIG. 23 and multiplies every unprocessed data by the value, the fourth embodiment uses the value obtained at Step A3-2 as a multiplier by which only unprocessed data on the periphery of the related white-line part is multiplied.

Figure 20:
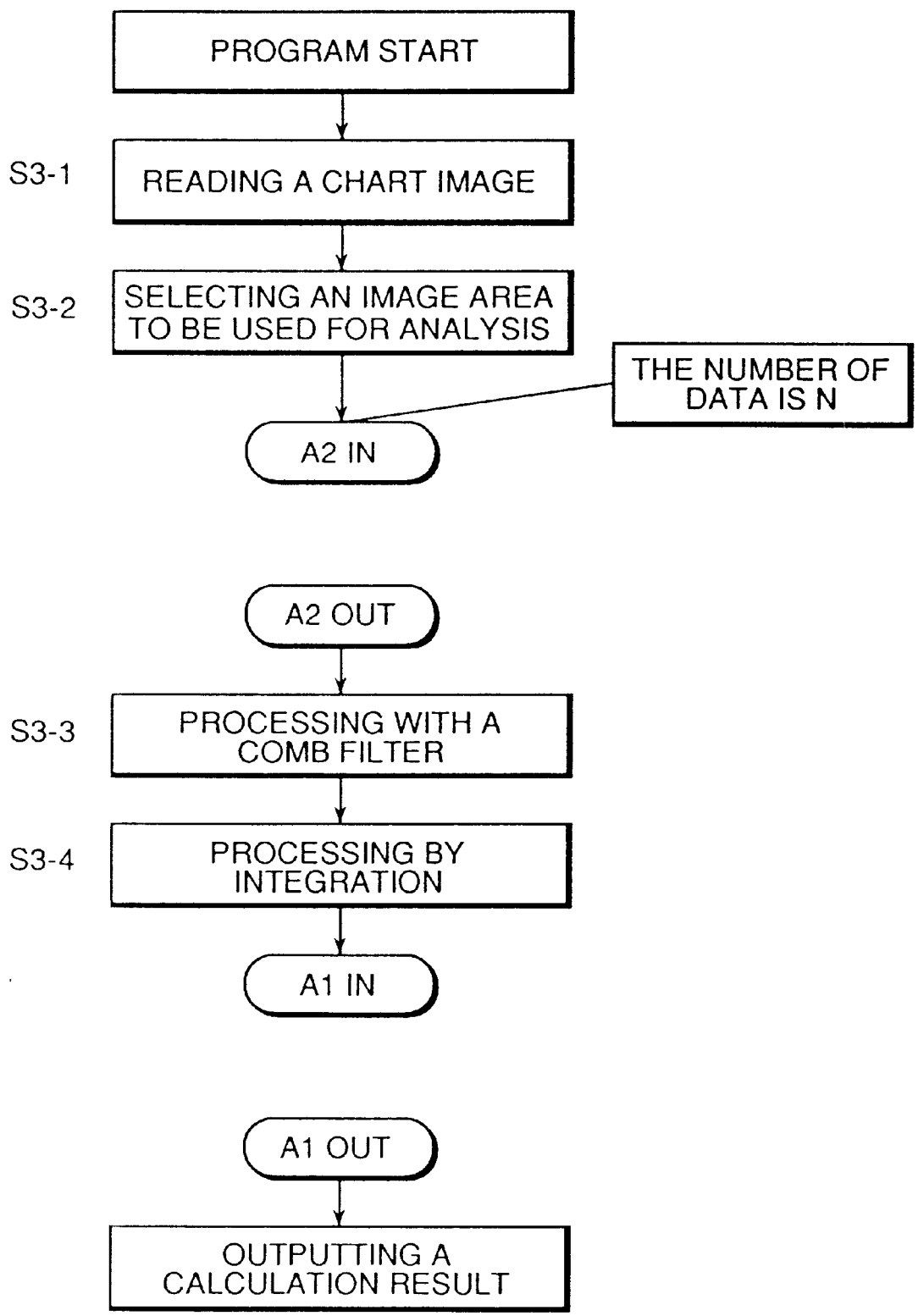
FIG. 20 is a flow chart of an embodiment of the present invention.
Figure 21:
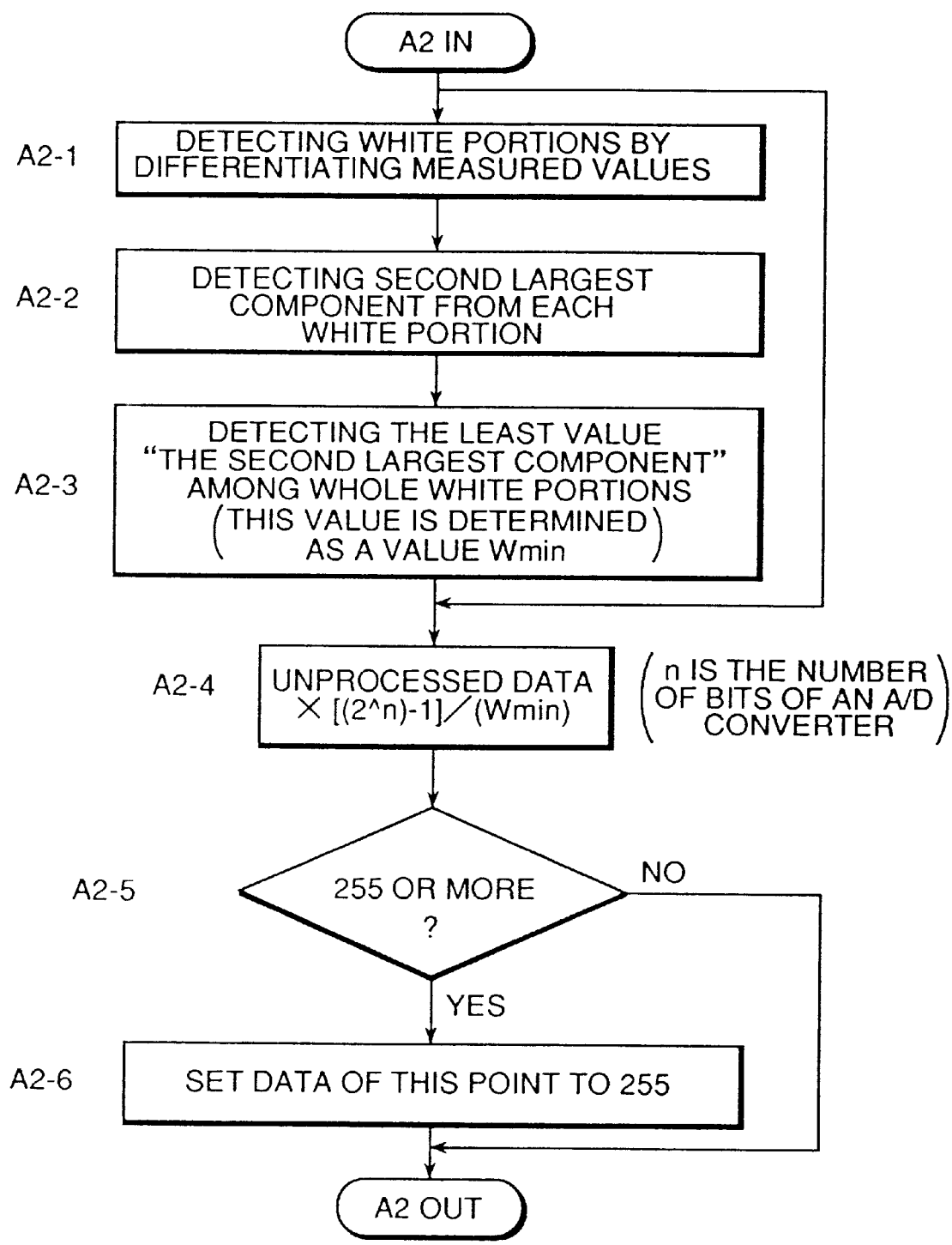
FIG. 21 is a flow chart of an embodiment of the present invention.

After the above processing, the flow chart is identical to the flow chart of the third embodiment (FIG. 20).

[Fifth Embodiment of the Present Invention]

Figure 27:
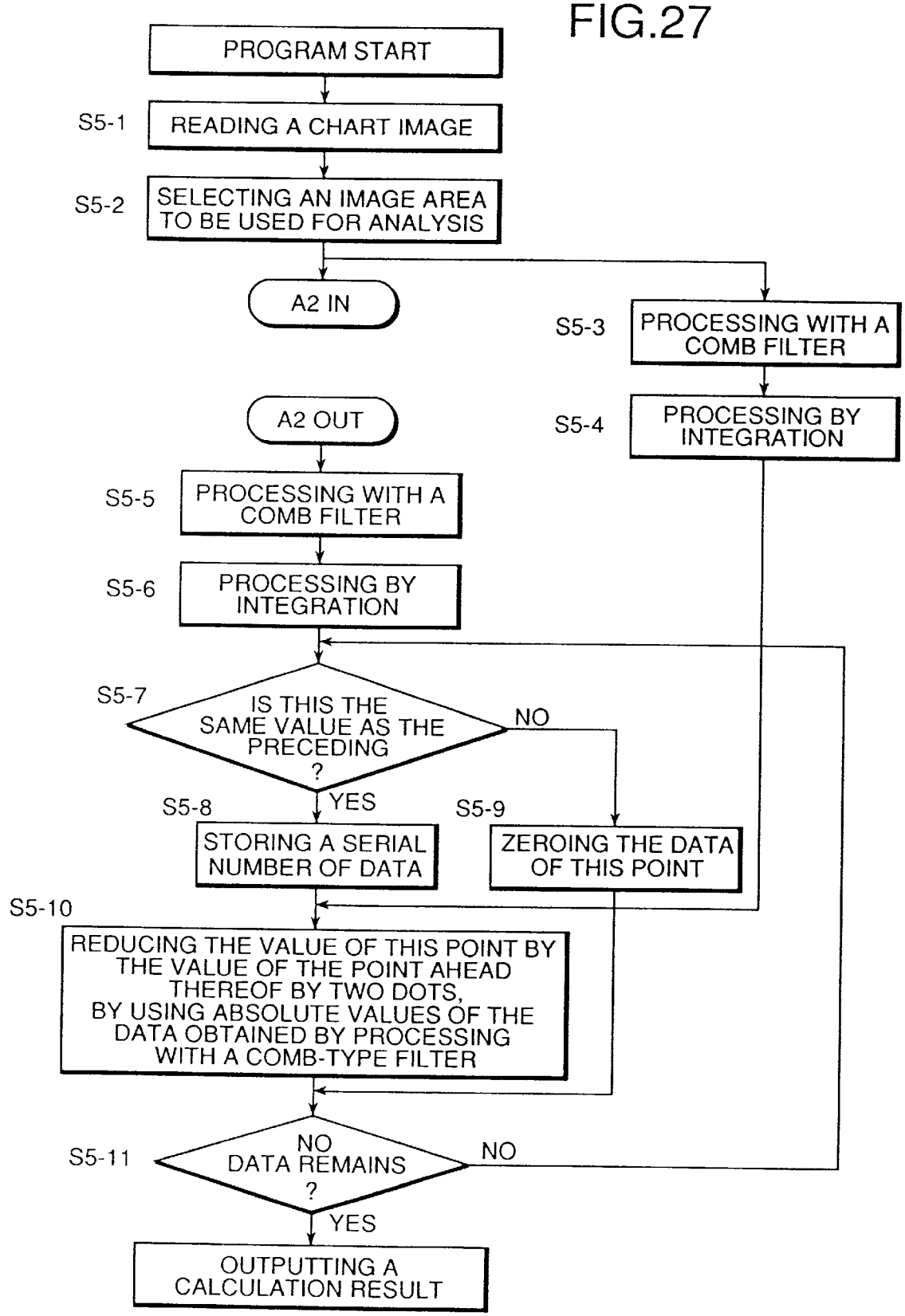
FIG. 27 is a flow chart of an embodiment of the present invention.

The operation of the fifth embodiment will be described below according the flow charts of FIG. 27. Steps S5-1, S5-2 are identical to Steps S1-1, S1-2 respectively, Steps S5-3, S5-5 are identical to Step S1-3, and Steps S5-4, S5-6 are identical to Steps S1-4.

After Step S5-2, the same data is used for calculations by Step S5-3 and a subroutine A2.

The flow chart after Step S5-6 is similar to the subroutine A1. In this embodiment, when the same values are continuously detected at Step S5-7, Step S5-8 stores the detected data position from the top of the image as a k-th position and Step S5-10 executes the subtraction calculation of the data by using the k-th data prepared by Step S5-4.

[Sixth Embodiment of the Present Invention]

Figure 28:
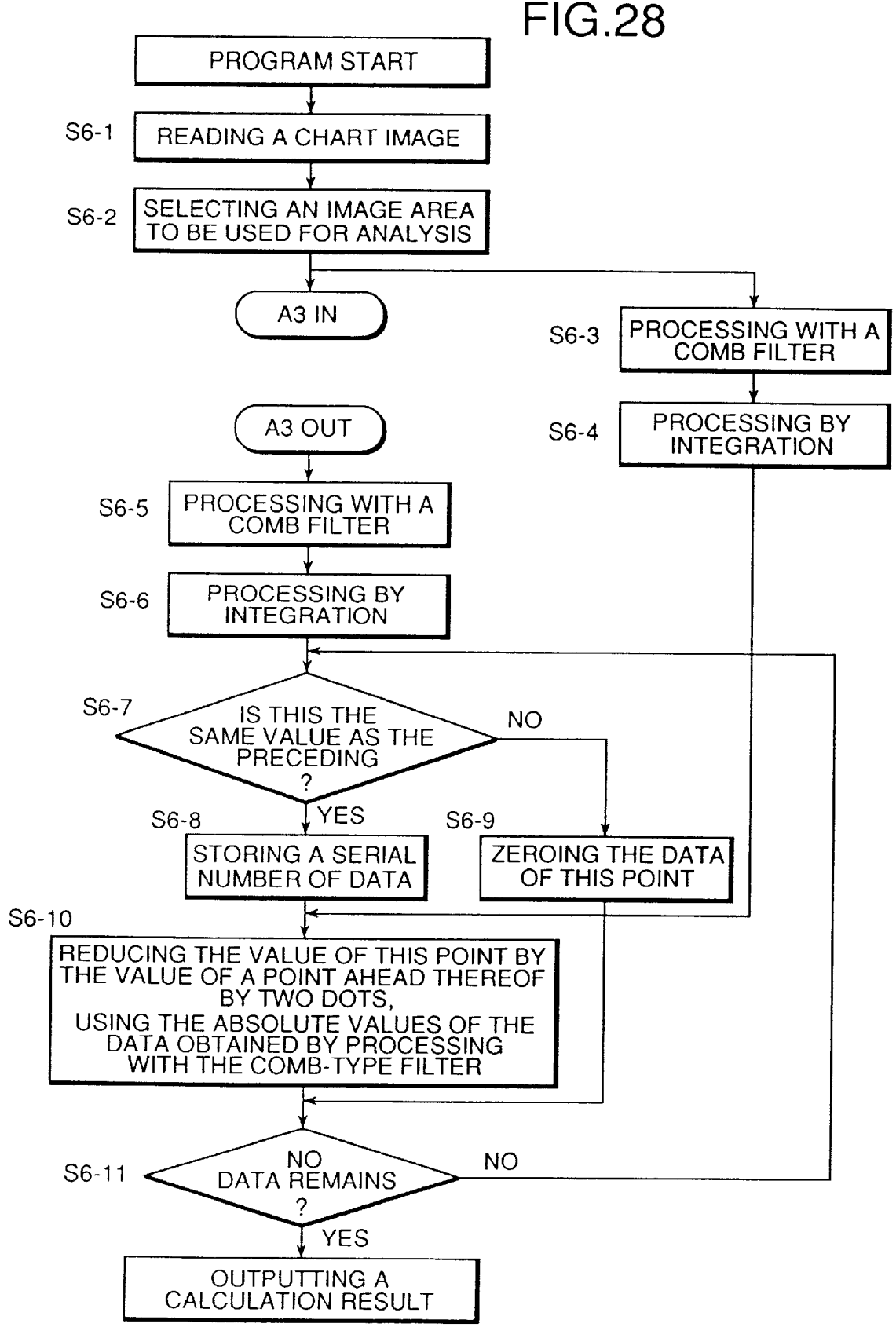
FIG. 28 is a flow chart of an embodiment of the present invention.

The operation of the sixth embodiment will be described below according the flow charts of FIG. 28. Steps S6-1 and S6-2 are identical to Steps S1-1 and S1-2, Steps 6-3 and S6-5 are identical to Steps S1-3 and Steps S6-4 and S6-6 are identical to Step 1-4.

After Step S6-2, the same data is used for calculations by Step S6-3 and a subroutine A3.

The flow chart after Step S6-6 is similar to the subroutine A1. In this embodiment, when the same values are continuously detected at Step S6-7, Step S6-8 stores the detected data position from the top of the image as a k-th position and Step S6-10 executes the subtraction calculation of the data by using the k-th data prepared by Step S6-4.

[Seventh Embodiment of the Present Invention]

Figure 29:
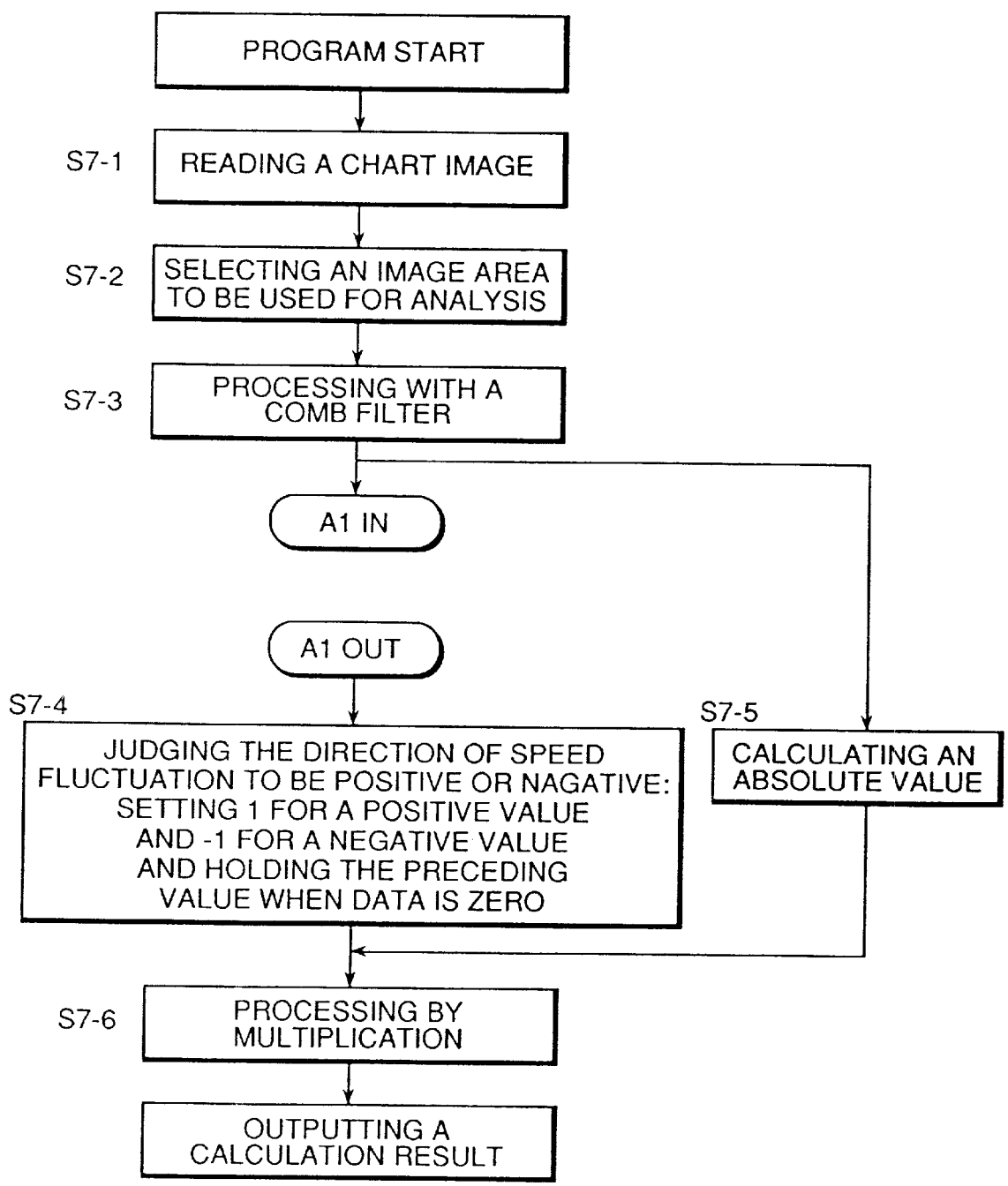
FIG. 29 is a flow chart of an embodiment of the present invention.

The operation of the sixth embodiment will be described below according the flow charts of FIG. 29. Steps S7-1 to S7-3 are identical to Steps S1-1 to S1-3 respectively.

Step S7-5 calculates an absolute value of the result obtained by Step S7-3 and Step S7-4 sets 1 for a positive result or −1 for a negative result of the routine A1 or judges the value to be positive or negative after holding the previous value when the result of the routine is 0. Step S7-6 executes the multiplication of the result of Step S7-4 by the result of Step S7-5.

[Eighth Embodiment of the Present Invention]

Figure 30:
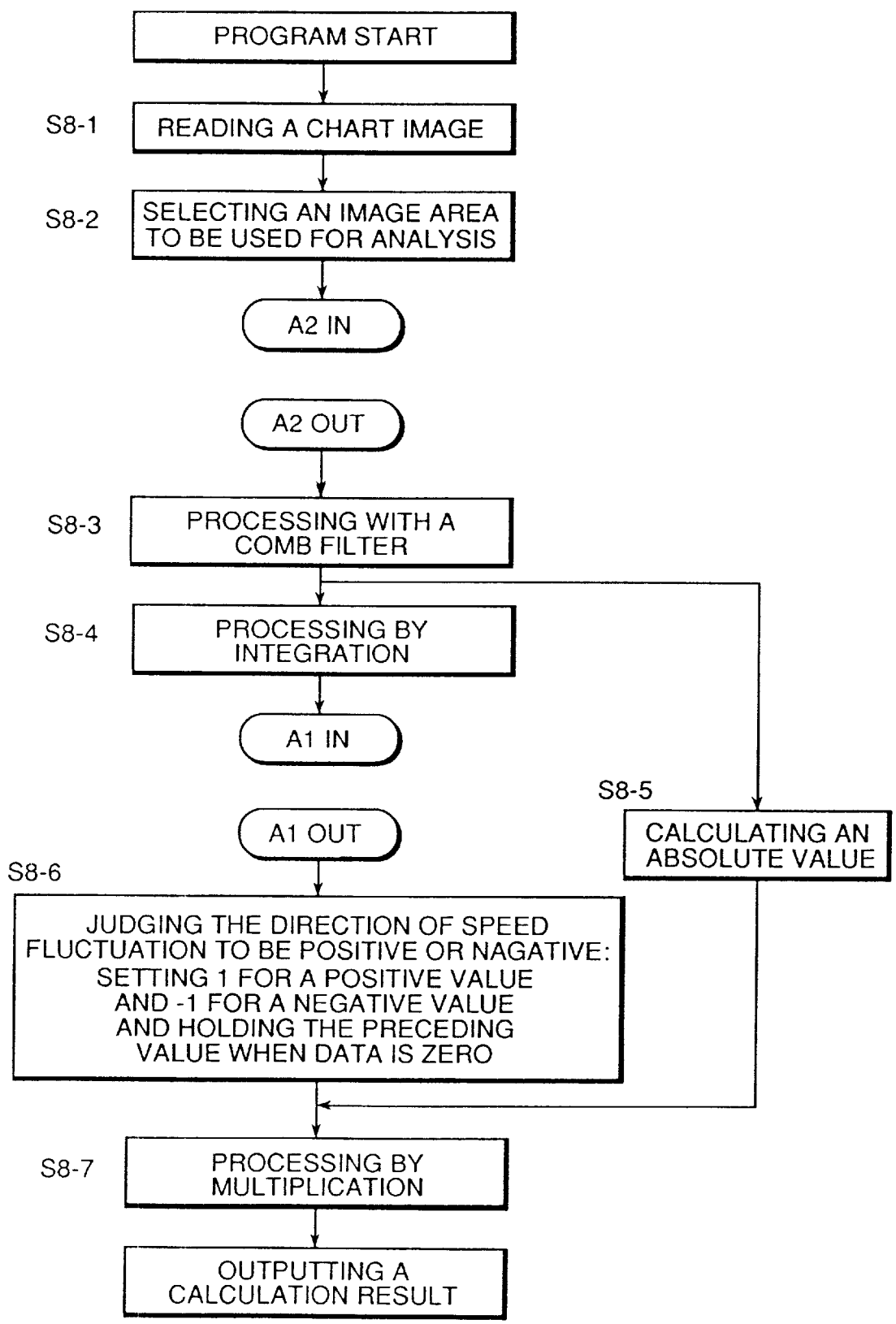
FIG. 30 is a flow chart of an embodiment of the present invention.

The flowchart of the eighth embodiment of the present invention is presented in FIG. 30. The flowchart before the subroutine A2 is identical to that of the third embodiment and the flowchart after the subroutine is identical to that of the seventh embodiment. The description is therefore omitted.

[Ninth Embodiment of the Present Invention]

Figure 31:
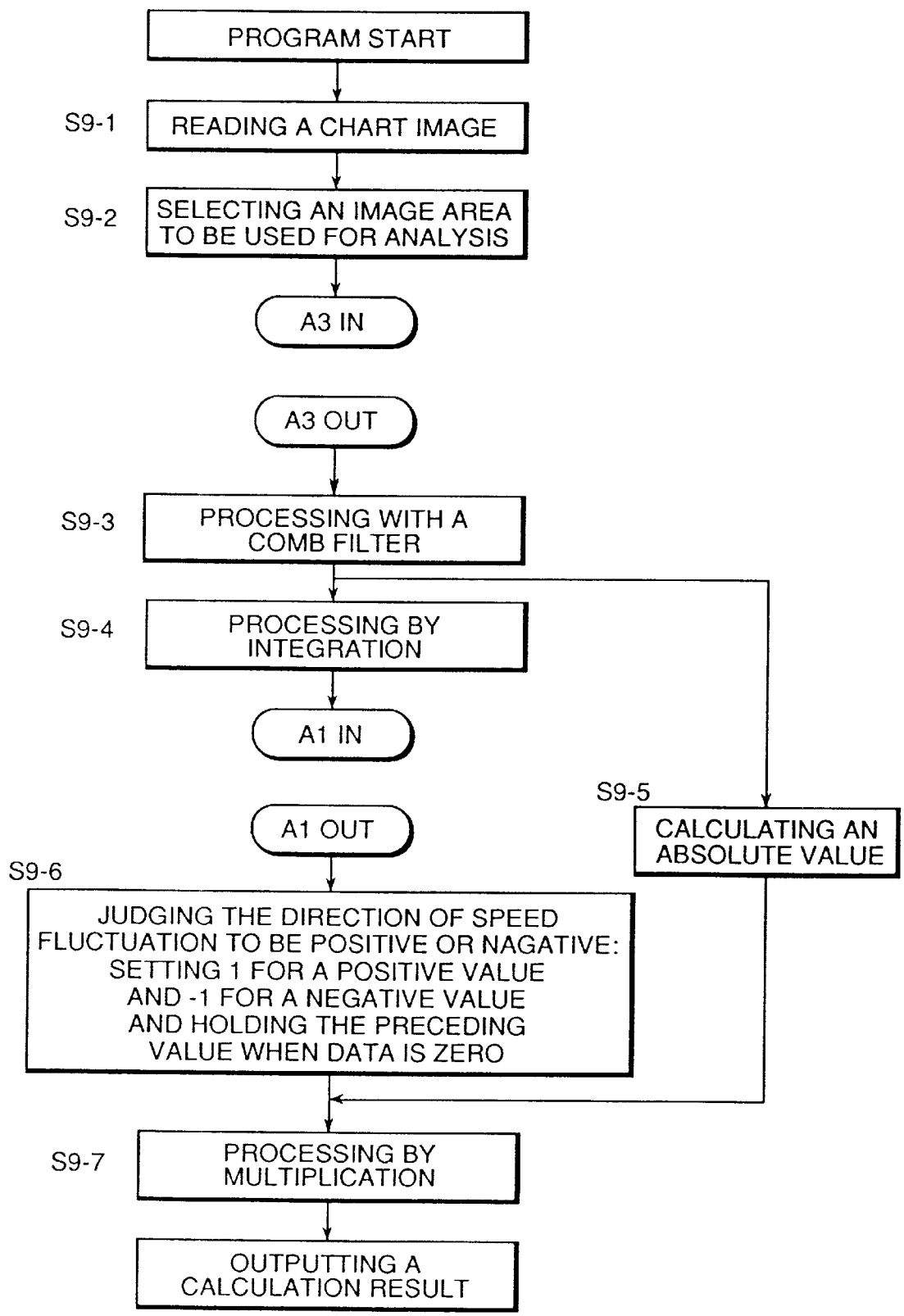
FIG. 31 is a flow chart of an embodiment of the present invention.

The flowchart of the ninth embodiment of the present invention is presented in FIG. 31. The flowchart before the subroutine A3 is identical to that of the fourth embodiment and the flowchart after the subroutine is identical to that of the seventh embodiment. The description is therefore omitted.

[Tenth Embodiment of the Present Invention]

Figure 32:
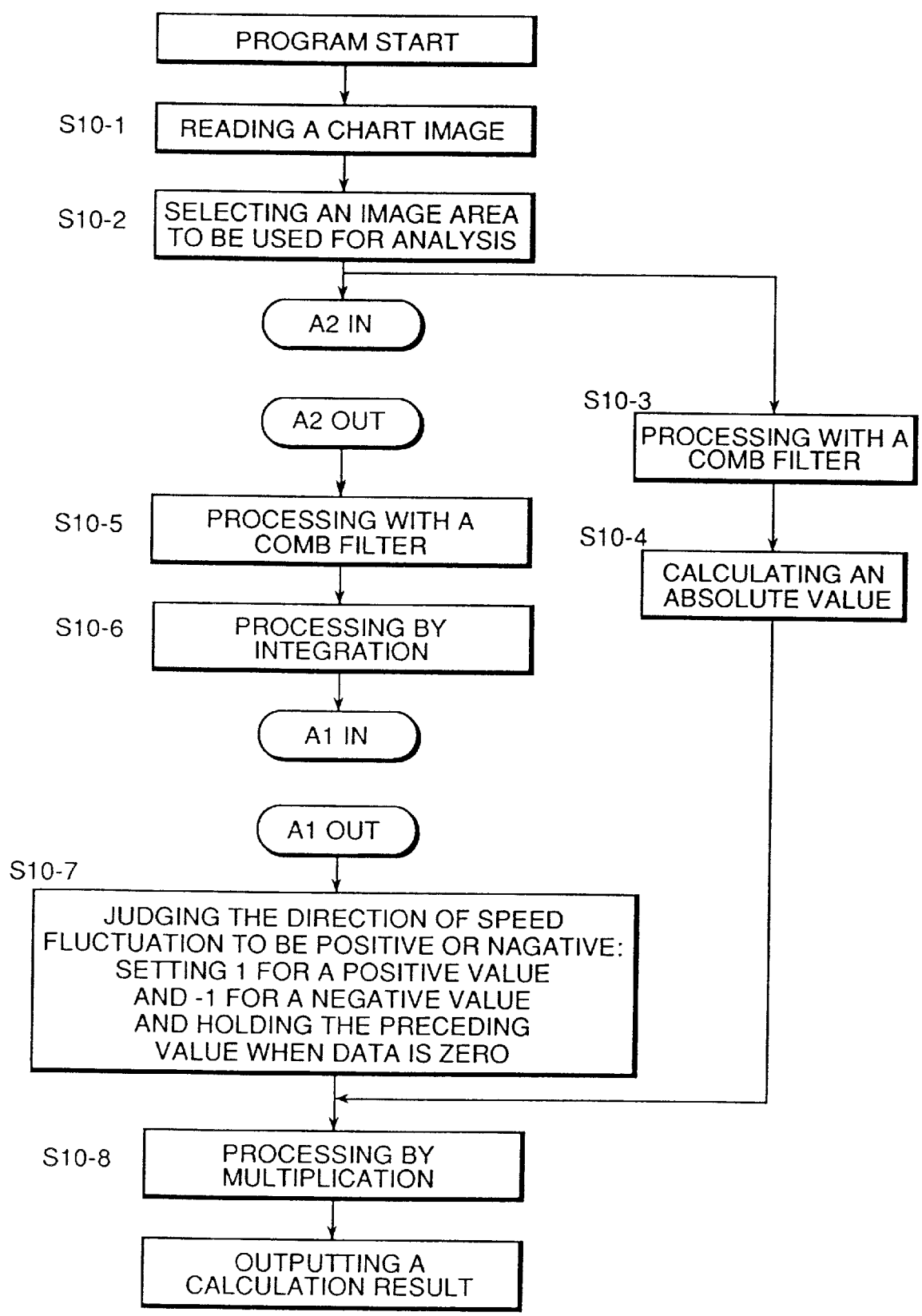
FIG. 32 is a flow chart of an embodiment of the present invention.

The flowchart of the tenth embodiment of the present invention is presented in FIG. 32. This flowchart is similar to the flowchart of the eighth embodiment except Step S10-8 at which the result of Step S10-7 is multiplied by the data processed with a comb filter (Step S10-3) and subjected to calculation of absolute values (Step S10-4) instead of the data having passed through the subroutine A2.

[Eleventh Embodiment of the Present Invention]

Figure 33:
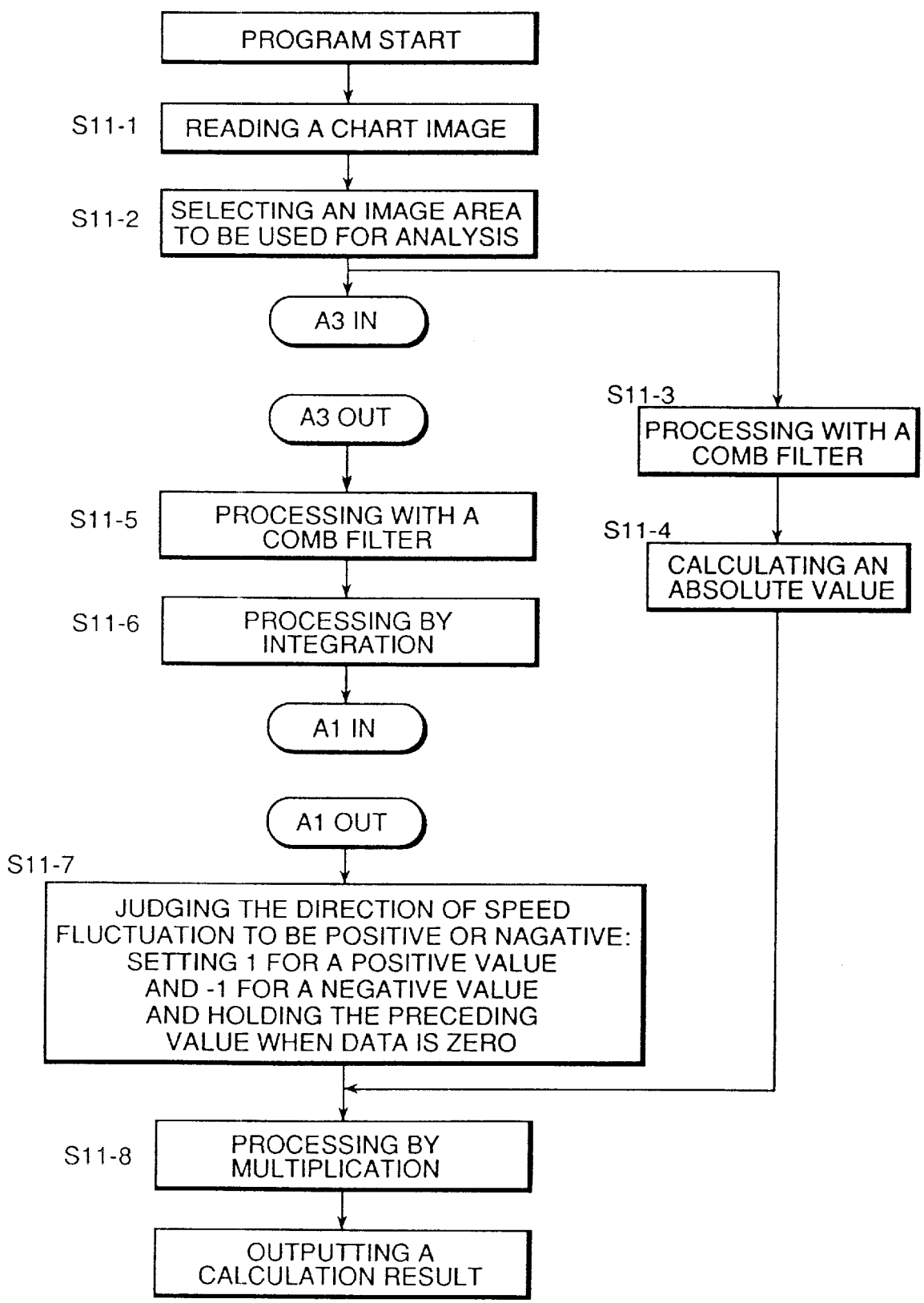
FIG. 33 is a flow chart of an embodiment of the present invention.

The flowchart of the eleventh embodiment of the present invention is presented in FIG. 33. This flowchart is similar to the flowchart of the tenth embodiment excepting that the subroutine A3 is used in place of the subroutine A2.

Other steps are similar to those of the tenth embodiment. Further description is therefore omitted.

The advantages of the present invention are as follows.

According to the present invention, it is possible to provide a document image reading device that can more stably read a document image by analyzing fluctuation of scanning speed of a scanner and controlling a driving motor of the device according to the result of analysis.

In other words, the device can separately extract components of the scanning speed fluctuation by reading variations of the optical density of respective reference scale lines, analyze the speed fluctuation state of its scanning means when scanning the image in the feed direction and eliminate the possibility of occurrence of image blur due to an unstable factor of the driving mechanism of the scanning means according to the analysis result.

A document-image reading device according to an aspect of the present invention can extract speed fluctuation based on variations of optical density of a speed fluctuation analyzing equal-pitch scale image read by an image reading means such as a line sensor, thus attaining higher resolution of analysis of the speed fluctuation as compared with a method of measuring spaces between lines of the equal-pitch scale image.

A document-image reading device according to another aspect of the present invention uses a measuring equal-pitch scale whose black (high-density) line or white (low-density) line has a width of two or more (integer) dots, thus eliminating the possibility of making the image data of the equal-pitch scale become an unanalysable 50% gray scale when the reading pitch cycle of the CCD in the feed direction deviates from the pitch cycle of the equal-pitch scale by a ½ dot.

In this device, the analysis result can be obtained by subtracting only peripheral portions when integrated values are the same subsequent values. This can avoid the affection of an abnormal value of the partial image on a whole analysis result, thus assuring the high accuracy of analysis.

A document-image reading device according to another aspect of the present invention can examine white (or black) levels of a whole image of an equal-pitch scale and compensate the whole image by using the same correction factor so that all the white (or black) portions may show a constant value. Therefore, the device can analyze the speed fluctuation of a scanner even when the white (or black) levels of the equal-pitch scale image cannot indicate a constant value due to insufficient adjustment of a signal processing system for an image reading section of the scanner.

The calculation amount can be saved since only one correcting value is used for correcting the white (or black) levels of the whole image.

The device can also examine the white (or black) levels of the equal-pitch scale image data and determine a specified correction value separately for each white (or black) portion so that the portion may have a preset constant value. This makes it possible to analyze the speed fluctuation without decreasing the analysis accuracy even if the white (or black) level of the scanner varies during the scanning.

In this case, the amount of calculation increases but the white level is real time measured and a correction value can be immediately determined with no need of waiting until the whole image data are measured. This enables designing a system capable of outputting the speed fluctuation analysis result just after reading the image.

A document-image reading device according to another aspect of the present invention uses corrected data only for determining the conditions of the speed fluctuation analysis and uses uncorrected data for determining speed fluctuation, then determines correction coefficients that make all white (or black) portions have a constant value. The device can therefore realize higher accuracy of the speed fluctuation analysis and less amount of calculation. The real time processing is also possible by determining correction factors for correcting respective white (or black) portions while the calculation amount increases.

A document-image reading device according to another aspect of the present invention calculates speed fluctuation by using absolute values of the resultant data obtained by processing the output of A/D converter with a comb filter.

Therefore, the finally obtained result of analysis may reflect each part changing from a white portion to a black portion and/or each part changing from a black portion to a white portion and, therefore, can attain increased accuracy.

The above-described processing may be conducted after correction for white (or black) shading with the same correction factor for all image-data, thus enabling the speed fluctuation analysis to be done even if the white levels of the equal-pitch scale did not meet a constant value due to insufficient adjustment of an image-reading signal-processing system of the scanner. Furthermore, the white (or black) level of the equal-pitch-scale image-data is corrected by using only one correction value for a whole image, thus achieving the saved amount of calculation.

The above-described processing may also be conducted after multiplying initial image data by corresponding correction factors separately determined for correcting respective white (or black) line portions to have a full bit value (or a zero value). This enables the device to accurately analyze the speed fluctuation even if the shading level varies during scanning operation.

The device can also attain higher accuracy of analysis in the case when the image-reading section changes its state while reading an image.

A document-image reading device according to another aspect of the present invention uses corrected values for separating white portions from black portions and uses uncorrected data for calculating speed fluctuation, thus attaining increased accuracy of the speed fluctuation analysis.

The device can also determine correction factors for correcting respective white (or black) line portions to have a full bit value (or a zero value) output of an A/D converter and can separately correct the respective portions with corresponding correction factors, thus increasing the speed fluctuation analysis and, at the same time, assuring accurate analysis even if the shading level varies during the scanning operation.

What is claimed is:

1. A document-image reading device comprising a document image reading means for reading image data from a document at a specified time-interval based on a reference clock by moving said document image reading means or the document in a feed direction, wherein said document-image reading means is provided with a reference-chart reading means for reading a reference chart representing alternations of a high-density division and low-density division with the same width equal to a least readable pitch along a feed direction and image-data processing means for processing the image data read from the reference chart with a comb filter and by integration, wherein said image-data processing means detects speed fluctuation by detecting variations of said density divisions and wherein said comb filter and integration remove initial chart data from extracted image data so that only a speed fluctuation component of the extracted image data is extracted.

* * * * *